US011461074B2

(12) United States Patent
Wang

(10) Patent No.: US 11,461,074 B2
(45) Date of Patent: Oct. 4, 2022

(54) MULTIPLE-DIGIT BINARY IN-MEMORY MULTIPLIER DEVICES

(71) Applicant: FlashSilicon Incorporation, Diamond Bar, CA (US)

(72) Inventor: Lee Wang, Diamond Bar, CA (US)

(73) Assignee: FLASHSILICON INCORPORATION, Diamond Bar, CA (US)

( * ) Notice: Subject to any disclaimer, the term of this patent is extended or adjusted under 35 U.S.C. 154(b) by 158 days.

(21) Appl. No.: 16/925,650

(22) Filed: Jul. 10, 2020

(65) Prior Publication Data

US 2022/0012011 A1   Jan. 13, 2022

(51) Int. Cl.
  *G06F 7/523* (2006.01)
  *G06F 7/40* (2006.01)

(52) U.S. Cl.
  CPC .............. *G06F 7/405* (2013.01); *G06F 7/523* (2013.01)

(58) Field of Classification Search
  CPC . G06F 7/523; G06F 7/52; G06F 7/502; G06F 7/465; G06F 7/446; G06F 7/4983; G06F 7/4988; G06F 7/487; G06F 7/4876; G06F 7/405; G06F 7/544; G06F 7/5443; G06F 15/7821; G06F 15/785
  See application file for complete search history.

(56) References Cited

U.S. PATENT DOCUMENTS

| | | | | |
|---|---|---|---|---|
| 5,255,216 A | * | 10/1993 | Blanz | G06F 1/0356 |
| | | | | 708/620 |
| 9,754,668 B1 | * | 9/2017 | Wang | G06F 12/10 |
| 2011/0314252 A1 | * | 12/2011 | Lundqvist | G06F 7/523 |
| | | | | 711/E12.078 |
| 2021/0357154 A1 | * | 11/2021 | Song | G06F 11/1068 |

OTHER PUBLICATIONS

Www.facebook.com/umairhussaini. "Multiplier—Designing of 2-Bit and 3-Bit Binary Multiplier Circuits." Technobyte, Feb. 5, 2020, https://technobyte.org/multiplier-2-bit-3-bit-digital/. (Year: 2020).*

* cited by examiner

*Primary Examiner* — Jyoti Mehta
*Assistant Examiner* — Huy Duong
(74) *Attorney, Agent, or Firm* — Muncy, Geissler, Olds & Lowe, P.C.

(57) ABSTRACT

The multi-digit binary in-memory multiplication devices are disclosed. The multi-digit binary in-memory multiplication devices of the invention can dramatically reduce the operational steps in comparison with the conventional binary multiplier device. In one embodiment with the expense of more hardware, the in-memory multiplication device can achieve one single step operation. Consequently, the multi-digit binary in-memory multiplication device can improve the computation efficiency and save the computation power by eliminating the data transportations between Arithmetic Logic Unit (ALU), registers, and memory units.

29 Claims, 18 Drawing Sheets n-bit by n-bit Multiplication Table: $M_{ij} = A_i * B_j$

| B \ A | 0<br>00..00..00b | 1<br>00..00..01b | ... | $2^{n-1}-1$<br>01..11..11b | ... | $2^n-2$<br>11..11..10b | $2^n-1$<br>11..11..11b |
|---|---|---|---|---|---|---|---|
| 0<br>00..00..00b | 0<br>00..00..00 00..00..00b | 0<br>00..00..00 00..00..00b | ... | 0<br>00..00..00 00..00..00b | ... | 0<br>00..00..00 00..00..00b | 0<br>00..00..00 00..00..00b |
| 1<br>00..00..01b | 0<br>00..00..00 00..00..00b | 1<br>00..00..00 00..00..01b | ... | $2^{n-1}-1$<br>00..00..00 01..11..11b | ... | $2^n-2$<br>00..00..00 11..11..10b | $2^n-1$<br>00..00..00 11..11..11b |
| ... | 0<br>00..00..00 00..00..00b | ... | ... | ... | ... | ... | ... |
| $2^{n-1}-1$<br>01..11..11b | 0<br>00..00..00 00..00..00b | $2^{n-1}-1$<br>00..00..00 01..11..11b | ... | $2^{2n-2}-2^n+1$<br>00..11..11 00..00..01b | ... | $2^{2n-1}-2^{n+1}+2$<br>01..11..10 00..00..10b | $2^{2n-1}-2^{n-1}-1$<br>01..11..10 10..00..01b |
| $2^n-2$<br>11..11..10b | 0<br>00..00..00 00..00..00b | $2^n-2$<br>00..00..00 11..11..10b | ... | $2^{2n-1}-2^{n+1}+2$<br>01..11..10 00..00..10b | ... | $2^{2n}-2^{n+2}+2^2$<br>11..11..00 00..00..00b | $2^{2n}-2^{n+1}-2^n+2$<br>11..11..01 00..00..10b |
| $2^n-1$<br>11..11..11b | 0<br>00..00..00 00..00..00b | $2^n-1$<br>00..00..00 11..11..11b | ... | $2^{2n}-2^{n-1}-1$<br>01..11..10 10..00..01b | ... | $2^{2n}-2^{n+1}-2^n+2$<br>11..11..01 00..00..10b | $2^{2n}-2^{n+1}+1$<br>11..11..10 00..00..01b |

Fig. 2

"2n-bit" Input Bus Lines

Fig. 13

MULTIPLE-DIGIT BINARY IN-MEMORY MULTIPLIER DEVICES

BACKGROUND OF THE INVENTION

Field of the Invention

The invention is related to the binary in-memory multiplication devices for two integer operands. In particular, for improving the computation efficiency and saving computation power, multiple-digit binary in-memory multiplication devices comprising memory arrays for storing the base-$2^n$ multiplication table are applied to eliminate the binary multiply-accumulation operations in the conventional binary multiplier devices. Furthermore, the multiple-digit binary in-memory multiplication devices can be constructed to expand their binary multiplication capability beyond the base-$2^n$ multiplication table by scaling up the binary representations of integer numbers with the multiple-digit base-$2^n$ format.

Description of the Related Art

In the modern Von Neumann computing architecture as shown in FIG. 1, the Central Process Unit (CPU) executes logic operations according to the instructions and data from the main memory. The CPU 10 includes a main memory 11, an Arithmetic and Logic Unit (ALU) 12, an input/output equipment 13 and a program control unit 14. Prior to the computation process, the CPU 10 is set by the program control unit 14 to point to the initial address code for the initial instruction in the main memory. The digital data are then processed with the ALU 12 according to the sequential instructions in the main memory 11 accessed by the clock-synchronized address pointer in the program control unit 14. The digital logic computation process for CPU 10 is synchronously executed and driven by a set of pre-written sequential instructions stored in the instruction memory unit.

In digital computer systems based on the Von Neumann computing architecture numbers are represented in the binary formats. For example, an integer number f in the n-bit binary format is given by $$I = b_{m-1}2^{m-1} + b_{m-2}2^{m-2} + \ldots + b_1 2^1 + b_0 = (b_{m-1} b_{m-2} b_1 b_0)_b,$$

where $b_i = [0, 1]$ for $i = 0, \ldots, (m-1)$, and the symbol "b" indicates the integer number in the binary format.

The arithmetic operations such as multiplication, addition, subtraction, and division for integer numbers require manipulating the binary codes of the operant integer numbers to obtain the correct binary representation of the resultant integer numbers for the arithmetic operations. The manipulations of the operant binary codes include feeding the binary codes into the combinational logic gates and placing the operational code data in the correct positions of the registers and memory units in IC chips. Therefore the more manipulation steps of moving the binary codes in and out of various memory units, registers, and combinational gate logic units through their connecting bus-lines the more computing power is consumed. Specially, when the computing processor is operated at the bit-level manipulations of the code strings with a fixed bandwidth bus-lines the power consumptions from charging and discharging the capacitances of the connecting bus-lines, the logic gates, and registers, and the memories will significantly increase with the increasing operational steps as the power $P \sim f \times C \times V_{DD}^2$, where f is the step cycles per processing time period, C is the total associated charging/discharging capacitances for the entire computing process, and $V_{DD}$ is the high voltage supply. For example, the multiplication of two integer numbers represented by two n-bit binary codes is usually done by the so-called Multiply-Accumulation (MA) sequence: taking each single-bit of one "n-bit" operand to multiply ("AND" operation) with the other "n-bit" operand to obtain the "n" of "n-bit" binary codes; shifting each "n-bit" binary code into the correct positions in the "n" rows of 2n-bit long registers; filling the empty bit registers with zeros for each row of the 2n-bit long registers; performing the "(n−1)" steps of addition operations for the "n" number of 2n-bit long code strings in the registers to obtain the multiplication 2n-bit long binary code string. The tedious steps of bit-level manipulations with the fixed bandwidth bus-lines for data transportation indeed increase the loading of computing processors. The heavy data traffics moving in and out of the memory units, logic gates, and registers as in the pipeline processing may also create the bus-line congestions for processors. The so-called Von Neumann bottleneck caused by the bus-line congestions of heavy data traffics is the main reason for slowing down the computation processes. Furthermore the more operational steps for the bit-level manipulations of computation processes the more numbers of instruction codes and intermediary data are necessary to store in memory units resulting in more silicon areas for memory arrays in IC chips.

In the main aspect of this invention, instead of applying Arithmetic Logic Unit (ALU) for the arithmetic computations as in the conventional computer chips based on the Von Neumann computing architecture, we apply memory arrays for direct arithmetic computations to reduce the frequencies of data transportations through the connecting bus-lines between ALUs, buffers, registers, memory units for saving the computing power and improving the computing efficiency.

In the U.S. patent application Ser. No. 16/675,554 (the disclosure of which is incorporated herein by reference in its entirety), the memory arrays storing the operational code information of the arithmetic tables are applied for the in-memory processors to achieve the "one-step" direct-computations by eliminating the multiple many steps of tedious bit-level manipulations between ALUs, buffers, registers, and memory units. However, when the numbers of processing bits are scaled up to a large number "n", the numbers of table cells in the correspondent arithmetic tables are also scaled up by $2^{2n}$ cells. That is, every increasing number of bits from "n" to "(n+1)" would be the four times increase of the original numbers of table cells in the arithmetic table as $(2^{2(n+1)} = 4 \times (2^{2n}))$. Therefore the sizes of memory arrays in the in-memory processors for large numbers of bits cannot be scaled up freely as the constrains of silicon costs for the areas of the in-memory processors in IC chips and the performance of processing speeds for the signal propagating delays inside the large memory arrays. To resolve the issue of oversizing memory arrays for the large number of bits of arithmetic operations, we shall divide the large number of bits into multiple-digit base-$2^n$ arithmetic operations (n>1) such that the memory array sizes for the base-$2^n$ arithmetic tables still remain reasonably small resulting in properly small silicon areas and high enough processing speeds. The way we organize the large binary integer numbers in base-$2^n$ format for the arithmetic operations is similar to that a human applies the memorized single-digit multiplication table: $0 \times 0 = 0, \ldots, 1 \times 1 = 1, 1 \times 2 = 2, \ldots, 9 \times 9 = 81$, to his/her multiplication exercise for two multiple-digit decimal numbers.

In another aspect of this invention, the operational steps for the binary multiplication can be dramatically reduced as the following: the m-digit base-$2^n$ integer numbers are represented by (m*n) bits, i.e., (m-digit)*(n-bit). The "digit" multiplication for two (m*n)-bit operands usually requires "$m^2$" multiply steps and "(m−1)" addition steps to obtain the final binary multiplication result. On the other hand the "binary" multiplication for two (m*n)-bit operands in the conventional scheme usually require "(m*n)$^2$" multiply steps and "(m*n−1)" addition steps. Therefore the operational steps for the "digit" multiplications of two (m*n)-bit operands are dramatically reduced by ~"$n^2$" times multiply steps and ~"n" times addition steps.

In another aspect of this invention, the binary multiplications of two multiple-digit base-$2^n$ integer operands can be implemented with three schemes: (1) digit-by-digit sequential operations utilizing only one single memory array for storing the product codes of the multiplication table in FIG. 2 with "$m^2$" operational steps; (2) digit/multi-digit sequential operation utilizing "m" units of memory arrays for storing the product codes of the multiplication table in FIG. 2 with "m" operation steps; (3) parallel multiple-digit operations utilizing "$m^2$" units of memory arrays for storing the product codes of the multiplication table in FIG. 2 with one single operational step. The digit-by-digit sequential operation has the advantage of hardware saving by using only one single unit of memory array, while the parallel multiple-digit operations has the advantage of one-step processing.

SUMMARY OF THE INVENTION

The integer number A with "m" digits in base-$2^n$ format is generally given by $$A = A_{m-1}X^{m-1} + A_{m-2}X^{m-2} + \ldots + A_1X^1 + A_0X^0 = (A_{m-1}A_{m-2}\ldots A_1A_0)X,$$

where $A_i$ for i=0, 1, . . . , (m−1), is the digit integer number given by the number in the integer number group of [0, 1, 2, . . . , ($2^n$−1)] and X=$2^n$.

Note that the symbol "X" indicates the number is in the base-$2^n$ format. The "i" digit integer number $A_i$ can be also given in the n-bit binary format as $A_i = (a_{i(n-1)}a_{i(n-2)} \cdots a_{i1}a_{i0})$b and $a_{ij}$=[0, 1] for j=0, 1, . . . , (n−1) according to the first column cells or the first row cells shown in the multiplication table in FIG. 2.

The multiplication number M for the two m-digit base-$2^n$ integer number operands (A and B) can be written as follows:

$$M = (A_{m-1}X^{m-1} + A_{m-2}X^{m-2} + \ldots + A_1X^1 + A_0X^0)*$$
$$(B_{m-1}X^{m-1} + B_{m-2}X^{m-2} + \ldots + B_1X^1 + B_0X^0) =$$
$$(A_{m-1}*B_{m-1})X^{2m-2} + (A_{m-1}*B_{m-2} + A_{m-2}*B_{m-1})$$
$$X^{2m-3} + \ldots + (A_1*B_0 + A_0*B_1)X^1 + (A_0*B_0)X^0.$$

The multiplication can be also viewed in FIG. 3 for the digit multiply/addition of multiplication for two m-digit base-$2^n$ operands similar to that for the multiplications of two m-digit decimal numbers. Each digit $B_j$ of the operand B multiplies the m-digit operand $A = A_{m-1}X^{m-1} + A_{m-2}X^{m-2} + \ldots + A_1X^1 + A_0$ to obtain the digit/multi-digit polynomial of $A_{m-1}*B_jX^{m-1+j} + A_{m-2}*B_jX^{m-2+j} + A_1*B_jX^{1+j} + A_0*B_jX^j$ for j=0, 1, 2, . . . , (m−1) and X=$2^n$. We note that every X shifts the polynomial by one digit position (equivalent to n-bits in binary positions) to the left. Stated in other way, multiplying the m-digit operand A by a term $B_jX^j$ is equivalent to increasing the degree of the polynomial representation of the operand A by j (equivalent to n-bits*j in binary positions). The final binary multiplication number for the two m-digit base-$2^n$ integer operands is obtained by applying (m−1) polynomial additions with the shifted digit/multi-digit polynomials in multiple increments of n-bits.

The schematics for generating the binary codes of the digit/multi-digit polynomial are shown in FIG. 4. The "m" in-memory multiplier units 500 (schematic details shown in FIG. 5) storing the multiplication codes based on the base-$2^n$ multiplication table in FIG. 2 are applied for the digit-digit multiply operations of $A_i*B_j$ for each inputted n-bit code of $A_i$ for i=0, 1, 2, . . . , (m−1) and a fixed inputted n-bit code of $B_j$. The voltage signals of the left-half n-bit of 5L(i) and the right-half n-bit of 5R(i) of the 2n-bit-long multiplication code from the outputs of the in-memory multiplier unit 500(i) propagate into the binary adder device 100 (schematic details in FIG. 10), which are connected with the connections of carry digit nodes 411 and 421 ($C_k$ for k=1, . . . , (m−1)) in the carry-chained configuration. Meanwhile the in-memory outputs 5L(i) and 5R(i+1) are connected with the inputs of each of n-bit binary adder unit 410(0) and 420(i) for i=1, 2, . . . , (m−2), respectively. And the in-memory outputs 5L(m−1) are solely connected with the inputs of n-bit binary adder unit (m−1) 430. The output signals of the entire binary adder units 410, 420 and 430 along with the outputs of 5R(0) are the voltage signals for the binary codes of the polynomial $A*B_j$. They can be sent into the (m*n+n)-bit polynomial register unit 440(j) for the temporary data storage or directly sent to the inputs of polynomial adders 110(1)-110(m−1) in FIG. 11 for the polynomial additions. The resultant binary code for the multiplication of A*B (detailed schematic shown in FIG. 11) is obtained from the polynomial additions of the polynomials $A*B_j$ for j=0, 1, 2, . . . , (m−1).

The memory arrays for the multiplication table in FIG. 2 in the multiplier units can be implemented with the Perpetual Digital Perceptron (PDP) as disclosed in U.S. patent application Ser. No. 16/717,444 for the simplicity and compactness of the Read Only Memory (ROM) arrays. In FIG. 5, the PDP in-memory multiplier unit 500 applied for the multiple-digit base-$2^n$ in-memory multiplication device (e.g., 140 in FIG. 14, 150 in FIGS. 15 and 160 in FIG. 16) comprises a "2n-bit" Input Buffer & Driver Unit 510, a series Content Read Only Memory (CROM) array 520, a Match Detector unit 530, and a Response Read Only Memory (RROM) array 540.

FIG. 6 shows the schematic of the Input Buffer and Driver Unit 510 consisting of "2n-bit" data flip-flips 620 for storing the 2n-bit inputted data and "2n-bit" of two-stage inverter driver 630 for driving the voltage signals onto the search-lines 511. When the PDP in-memory multiplier unit 500 is enabled by the "Enb" with a high voltage $V_{DD}$ at node 505, the "2n-bit" data flip-flops 620 receive the 2n-bit data voltage signals from "n-bit" data $A_i$ and "n-bit" data $B_j$ by Input bus-lines 501 and 502, respectively. The two-stage inverter drivers 630 then drive the applied voltage signals onto the search-lines $SL_k$ and complementary search-lines $\overline{SL_k}$, for k=0, . . . , (2n−1), in the CROM array 520.

FIG. 7 shows the schematic of the 2n-bit by $2^{2n}$-row CROM array 520. Each CROM cell 710 consists of a complementary pair of NMOSFET (N-type Metal Oxide Semiconductor Field Effect Transistor) devices N1 and N2, and a switching NMOSFET device N3. The two drain electrodes 703 and 704 of the complementary NMOSFET devices N1 and N2 in one column of CROM cells 710 are respectively connected to form the search-line SLi and its complementary search-line $\overline{SL_i}$ in the vertical direction, for i=0, 1, . . . , (2n−1) columns. In each CROM cell 710, the common electrode 705 of the complementary NMOSFET devices N1 and N2 is connected to the gate of the switching NMOSFET device N3. Each row of the switching NMOSFET devices N3 is connected in series to form a horizontal match-line $ML_k$, for k=0, 1, ..., $(2^{2n}-1)$ rows, in the CROM array 520. The left-hand end nodes 706 of all rows of the match-lines $ML_k$ are connected altogether to the ground voltage $V_{SS}$, while the right-hand end node 707 of each match-line $ML_k$ is respectively connected to correspondent "$k^{th}$" match-detector for k=0, 1, ..., $(2^{2n}-1)$, in the Match Detector Unit 530 through the match-lines 521. The digital voltage supply lines $V_{DD}$ and $V_{SS}$ run horizontally for each row of CROM cells 710 for the convenience of connection to the gates of the complementary NMOSFET devices N1 and N2 in the CROM cells 710. The gates of the complementary pair of NMOSFET device N1 and N2 in each cell 710 are respectively connected to the digital voltage rail lines ($V_{DD}$ and $V_{SS}$) by two metal contacts 701 (up right and down left) for storing datum "1", and to the digital voltage rail lines ($V_{DD}$ and $V_{SS}$) by two metal contacts 701 (down right and up left) for storing datum "0", as illustrated in the CROM cells 710 in the CROM array. A number $2^{2n}$ of 2n-bit operands $A_i$ and $B_j$ of multiplication table in FIG. 2 are hardwired in a number $2^{2n}$ of rows of CROM cells 710.

In FIG. 8, the Match Detector Unit 530 comprises a number ($2^{2n}$) of match-detectors 81 for sensing the voltage potentials at nodes 811 connected to the match-lines 521 and a number ($2^{2n}$) of flip-flops 82 for storing the matching status data of the match-lines 521. Each match-detector 81 consists of a high voltage supply PMOSFET device P1, an inverter $I_M$, and a charging capacitor $C_M$. When the match-detector 81 is activated by the "Enb" with a high voltage signal $V_{DD}$ at node 505, the high voltage supply PMOSFET device P1 is turned off to disconnect its correspondent match-line along with the capacitor node 811 from the high voltage rail $V_{DD}$. Since the matched match-line attached with the correspondent match-detector is discharged to the ground voltage potential, the voltage potential at node 811 will drop below the threshold voltage of the inverter $I_M$ to flip to the high voltage "$V_{DD}$" at the output node 821. While the voltage potentials at nodes 821 of the other inverters $I_M$ remain at the ground voltage $V_{SS}$ due to the remaining "high" voltage potentials at the gates above the inverters' flipping voltage at the nodes 811 accordingly with the effect of charge sharing between the "$V_{DD}$" voltage capacitor nodes 811 and the floating right-hand end nodes 707 of the un-matched match-lines in 521. The output voltage signals of the inverters $I_M$ are then stored in the match-status flip-flops 82.

The high voltage signal $V_{DD}$ at the output node 822 of the matched match-status flip-flop for the correspondent match-detector 81 is then applied to activate the correspondent wordline $WR_k$ ($0<=k<=2^{2n}-1$) in the 2n-bit by ($2^{2n}$)-row RROM array 540 to output the voltage signals of a 2n-bit multiplication code in the table cells of multiplication table in FIG. 2. On the other hand, the low voltage signals $V_{SS}$ at the output nodes 822 of the un-matched match-status flip-flops 82 deactivate the corresponding un-matched wordlines in the 2n-bit by ($2^{2n}$)-row RROM array 540.

FIG. 9 shows the schematic of the 2n-bit by ($2^{2n}$)-row RROM array. Each RROM cell 910 consists of an NMOSFET device N4. The gates 912 of the $k^{th}$ row of NMOSFET devices N4 are connected to form the wordline $WR_k$, for k=0, 1, ..., $(2^{2n}-1)$. The digital voltage supply lines $V_{DD}$ and $V_{SS}$ run vertically for conveniently connecting the source electrodes 911 of the NMOSFET device N4 for each column of RROM cells 910. The drain electrodes 913 of the NMOSFET devices N4 for the entire column are connected to form the vertical lines to the output nodes $m_{ijk}$ 503 for k=0, ..., (n-1), n, (2n-1). The voltage signals at the output nodes 503 are obtained from the voltage code signals passed by the row of NMOSFET devices N4 for the turned-on correspondent wordline $WR_k$, where $0<=k<=2^{2n}-1$. A number $2^{2n}$ of 2n-bit multiplication/product codes in the table cells of multiplication table in FIG. 2 are hardwired in a number $2^{2n}$ of rows of RROM cells 910. For storing the multiplication codes in the multiplication table in FIG. 2, the source electrode 911 of the NMOSFET device N4 for each RROM cell 910 is connected to the vertical high digital voltage "$V_{DD}$" line for storing digital datum "1" and the vertical low digital voltage "$V_{SS}$" line for storing digital datum "0", by a metal contact 915, respectively. A number $2^{2n}$ of 2n-bit response multiplication codes are stored (hardwired) in the correspondent ($2^{2n}$)-rows of RROM cells 910 in the RROM array 540. The correspondent wordline $WR_k$ ($0<=k<=2^{2n}-1$) is activated by the high voltage signal $V_{DD}$ from the correspondent match-detector 81 for each inputted operand data $A_i$ (n-bit) and $B_j$ (n-bit) matched with a row of 2n-bit binary code in the CROM array 520.

In summary, the basic function of PDP in-memory multiplier unit 500 is the following: when activated by the "Enb" with a high voltage signal $V_{DD}$ at node 505, the voltage signals of an inputted digital data from the bus-lines $A_i$ 501 and $B_j$ 502 are sent to the CROM array 520 for matching a row of stored binary codes (i.e., a multiplicand and a multiplier in the multiplication table in FIG. 2) in the CROM array 520 to generate the "high" voltage signal from the correspondent match-detector 81 in the match detector unit 530. The correspondent match-detector 81 then turns on the selected wordline $WR_k$ in the RROM array 540 to output the voltage signals of the response binary codes stored in the same row of RROM array 540 for the binary code (i.e., a product) of the correspondent cells in the multiplication table in FIG. 2. Therefore the binary codes (2n-bit long) for all possible combinations of two integer numbers ($A_i$ and $B_j$) are stored in CROM array 520 according to the first row on the top or the first column on the left of the n-bit by n-multiplication table in FIG. 2. When each inputted ($B_j$ and $A_i$) with the binary codes of ($b_{j(n-1)}b_{j(n-2)} \ldots b_{j1}b_{j0}$ $a_{i(n-1)}a_{i(n-2)} \ldots a_{i1}a_{i0}$)b are matched with a row of 2n-bit operand code stored in the CROM array 520, the RROM array 540 will respond with the voltage signals of the 2n-bit product code $M_{ij}=(m_{ij(2n-1)}, m_{ij(2n-2)}, \ldots, m_{ijn}, m_{ij(n-1)}, \ldots, m_{ij1}, m_{ij0})$b from the correspondent row for the multiplication operation of $M_{ij}=A_i*B_j$. According to the one-to-one mapping of CROM array 520 and RROM array 540 for the multiplication table cells, the numbers of rows for both memory arrays (CROM array 520 and RROM array 540) are ($2^{2n}$)-rows as the same number of cells in the n-bit by n-bit multiplication table in FIG. 2. Basically the functions of CROM array 520 and the Match Detector unit 530 are like the table cell pointer that points to the correspondent table cell in FIG. 2.

FIG. 10 shows the schematic for the (m*n)-bit carry-chained binary adder device 100 for adding the digit multiply codes. The carry-chained binary adder device 100 includes an n-bit carry-chained binary adder unit 410, a number (m−2) of n-bit carry-chained binary adder units 420 and an n-bit carry-chained binary adder unit 430. The first n-bit carry-chained binary adder unit (0) 410 comprises "(n−1)" carry-chained full adder devices 4f and one half adder device 4h for the inputs 5R(1) and 5L(0). The n-bit carry-chained binary adder unit (i) 420 comprises "n" full adder devices 4f for the inputs 5R(i+1) and 5L(i) for i=1, 2, ..., (m−2). The last n-bit carry-chained binary adder unit (m−1) 430 comprises "n" half adder devices 4h for the single set of inputs 5L(m−1). The (m*n)-bit outputs of the entire carry-chained binary adder device 100 along with the n-bit outputs 5R(0) together form the (m*n+n)-bit polynomial $A*B_j = (p_{(m*n+n-1)j} p_{(m*n+n-2)j} \cdots p_{nj} p_{(n-1)j} \cdots p_{0j})_b$, for j=0, 1, 2, . . . , (m−1).

The schematic for the polynomial additions are shown in FIG. 11. With the least significant n-bit outputs 114(0) of the first polynomial register unit 440(0) sent to the least significant n-bit registers of the resultant multiplication register unit 120, the most significant (m*n)-bit outputs 111(1) of the first polynomial register unit 440(0) along with the entire (m*n+n)-bit outputs 112(1) of the second polynomial register unit 440(1) are both sent to the first polynomial adder 110(1) (detailed schematic shown in FIG. 12a) for the first polynomial addition. Sequentially with the least significant n-bit outputs 114(1) from the first polynomial adder 110(1) sent to the "1$^{st}$" least significant n-bit registers in the resultant multiplication register unit 120, the most significant (m*n)-bit outputs 111(2) from the first polynomial adder 110(1) along with the entire (m*n+n)-bit outputs 112(2) of the third polynomial register unit 440(2) are then sent to the inputs of the second polynomial adder 110(2) (detailed schematic shown in FIG. 12b) for the second polynomial addition. In general for the sequential polynomial addition, with the least significant n-bit outputs 114(j−1) from the polynomial adder 110(j−1) sent to the "(j−1)$^{th}$" least significant n-bit registers in the resultant multiplication register unit 120, the most significant (m*n)-bit outputs 111(j) from the previous polynomial adder 110(j−1) with the (m*n+n)-bit outputs 112(j) of the polynomial register unit 440(j) are sent to the polynomial adder 110(j) (detailed schematic shown in FIG. 12b) for the "j$^{th}$" polynomial addition for j=2, 3, . . . , (m−2). For the last polynomial addition the most significant (m*n)-bit outputs 111(m−1) from the previous binary adder 110(m−2) along with the (m*n+n)-bit outputs 112(m−1) of the polynomial register unit 440(m−1) are sent to the polynomial adder 110(m−1) (detailed schematic shown in FIG. 12c). The (m*n+n)-bit outputs 114(m−1) from the last polynomial adder 110(m−1) are then sent to the most significant (m*n+n)-bit registers in the resultant multiplication register unit 120.

BRIEF DESCRIPTION OF THE DRAWINGS

For a better understanding of the present invention and to show how it may be carried into effect, reference will now be made to the following drawings, which show the preferred embodiment of the present invention, in which:

FIG. 2 shows the n-bit by n-bit multiplication table for two n-bit binary integer number operands.

FIG. 13 shows the binary codes of the 4-bit by 4-bit multiplication table stored in the PDP in-memory multiplier unit 141 according to an embodiment of the invention.

DETAILED DESCRIPTION OF THE INVENTION

Figure 1:
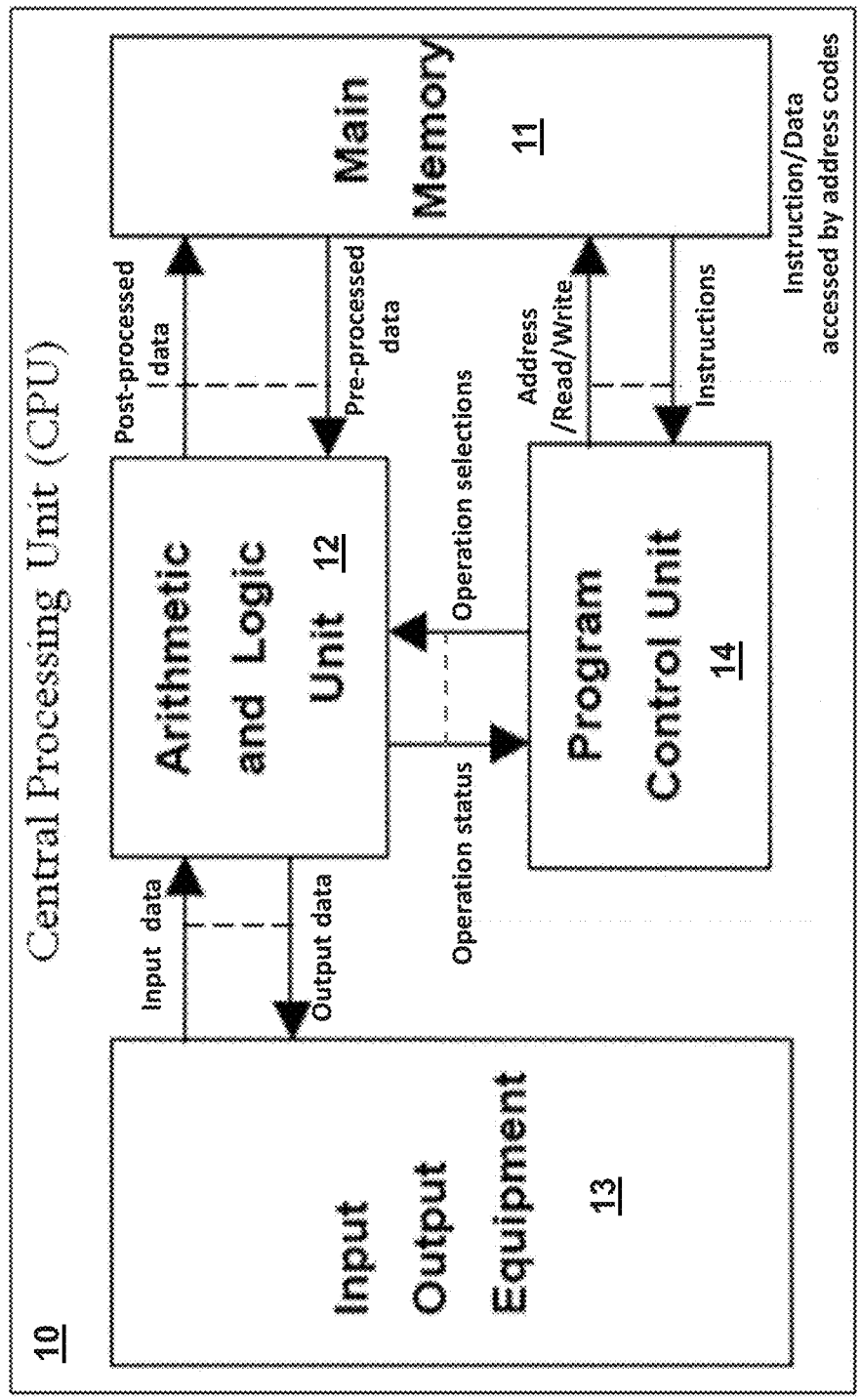
FIG. 1 shows the conventional Von-Neumann computing architecture for a typical Central Processing Unit (CPU).
Figure 3:
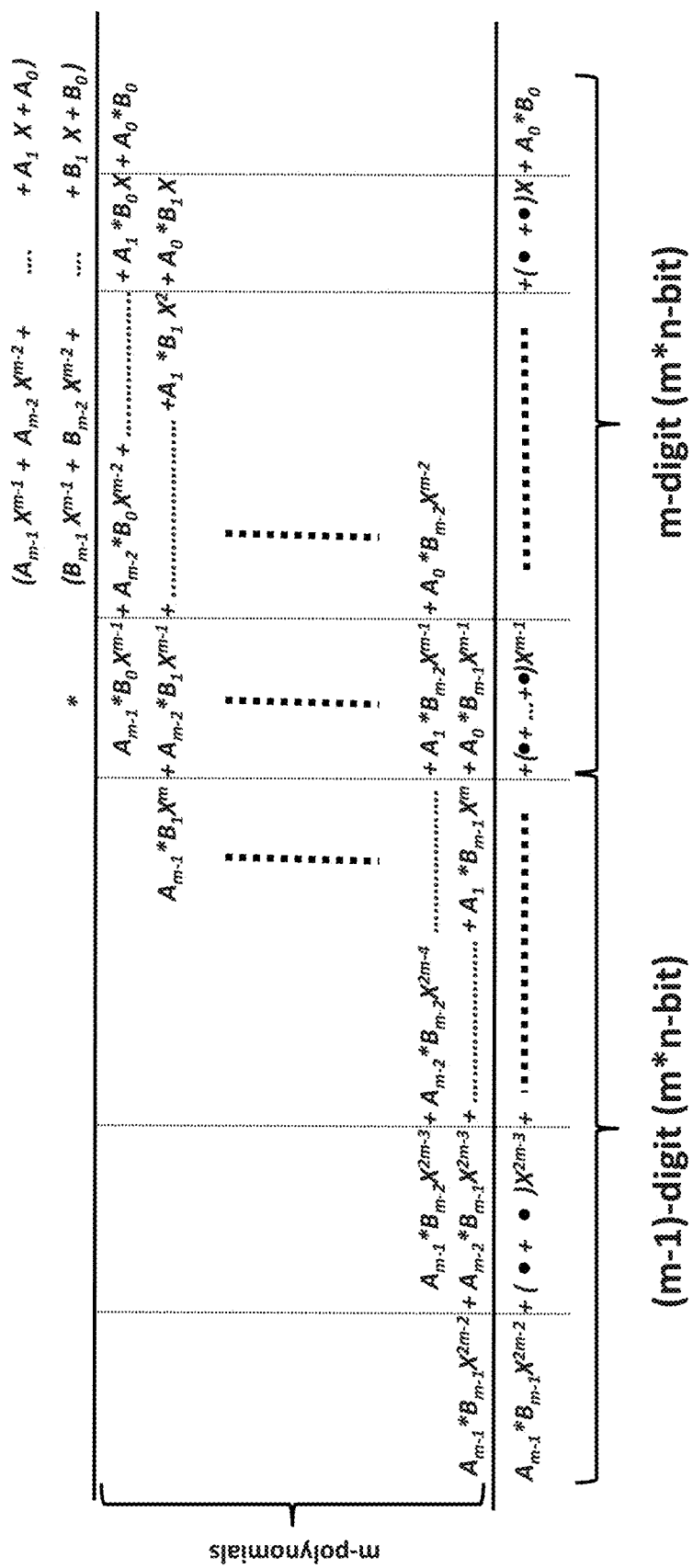
FIG. 3 shows the multiplication operations of two m-digit base-$2^n$ operands in the form of digit-multiply polynomials and polynomial additions according to the invention.
Figure 4:
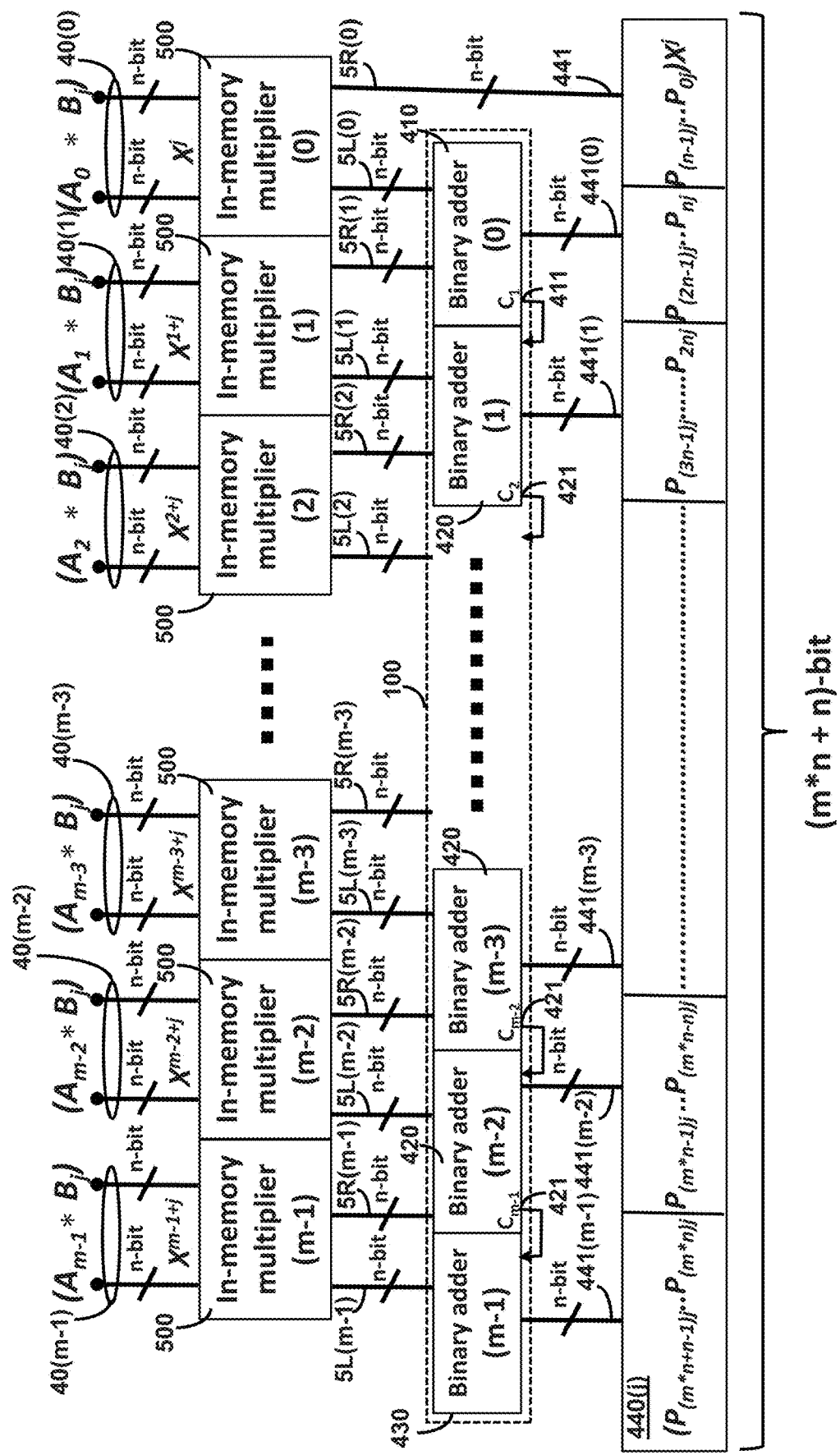
FIG. 4 shows the schematics for generating the digit-multiply polynomial according to the invention.
Figure 5:
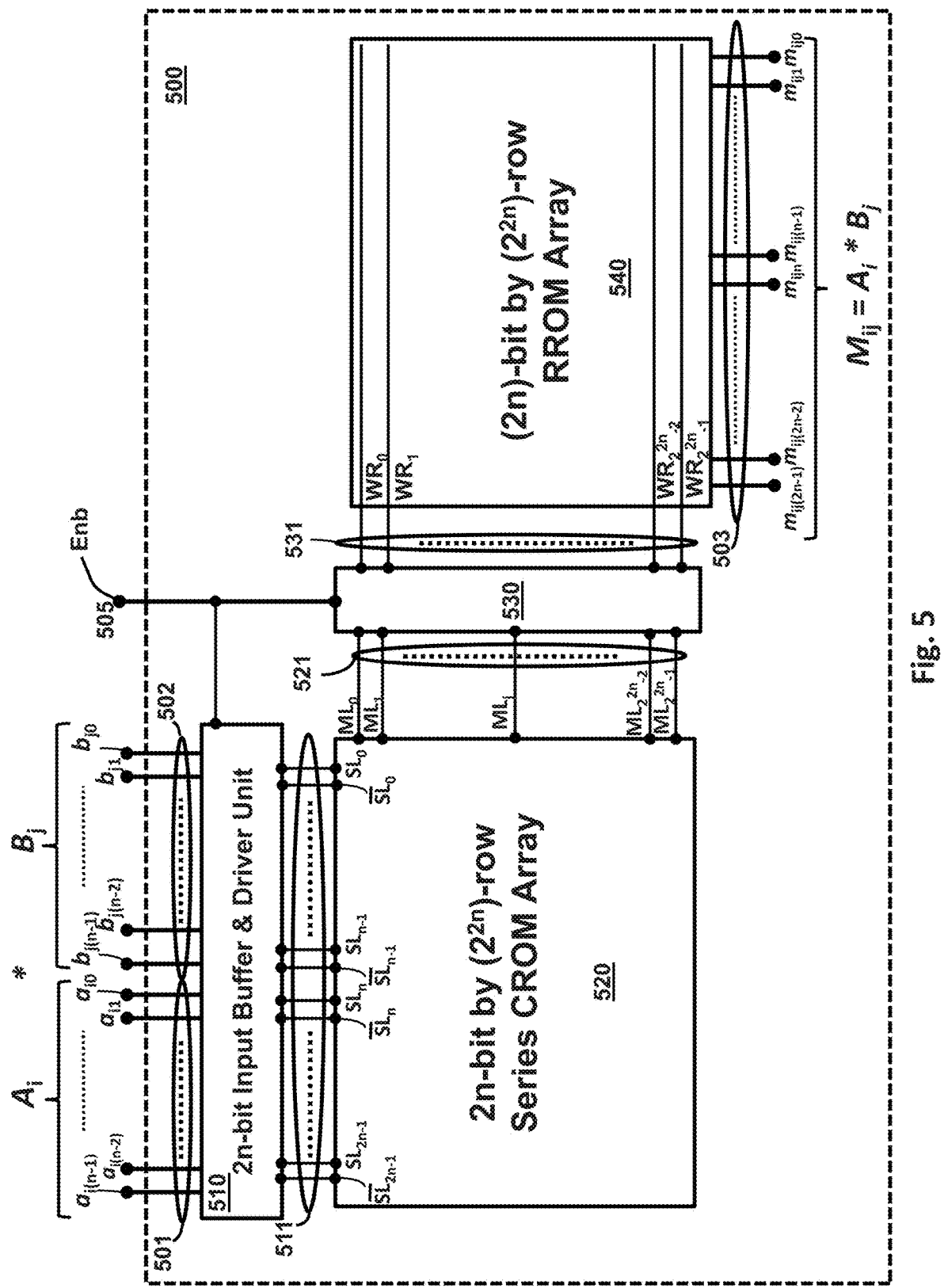
FIG. 5 shows the schematic of a Perpetual Digital Perceptron (PDP) base-$2^n$ in-memory multiplier unit for the digit-by-digit multiplication based on the n-bit-by-n-bit multiplication table in FIG. 2.
Figure 6:
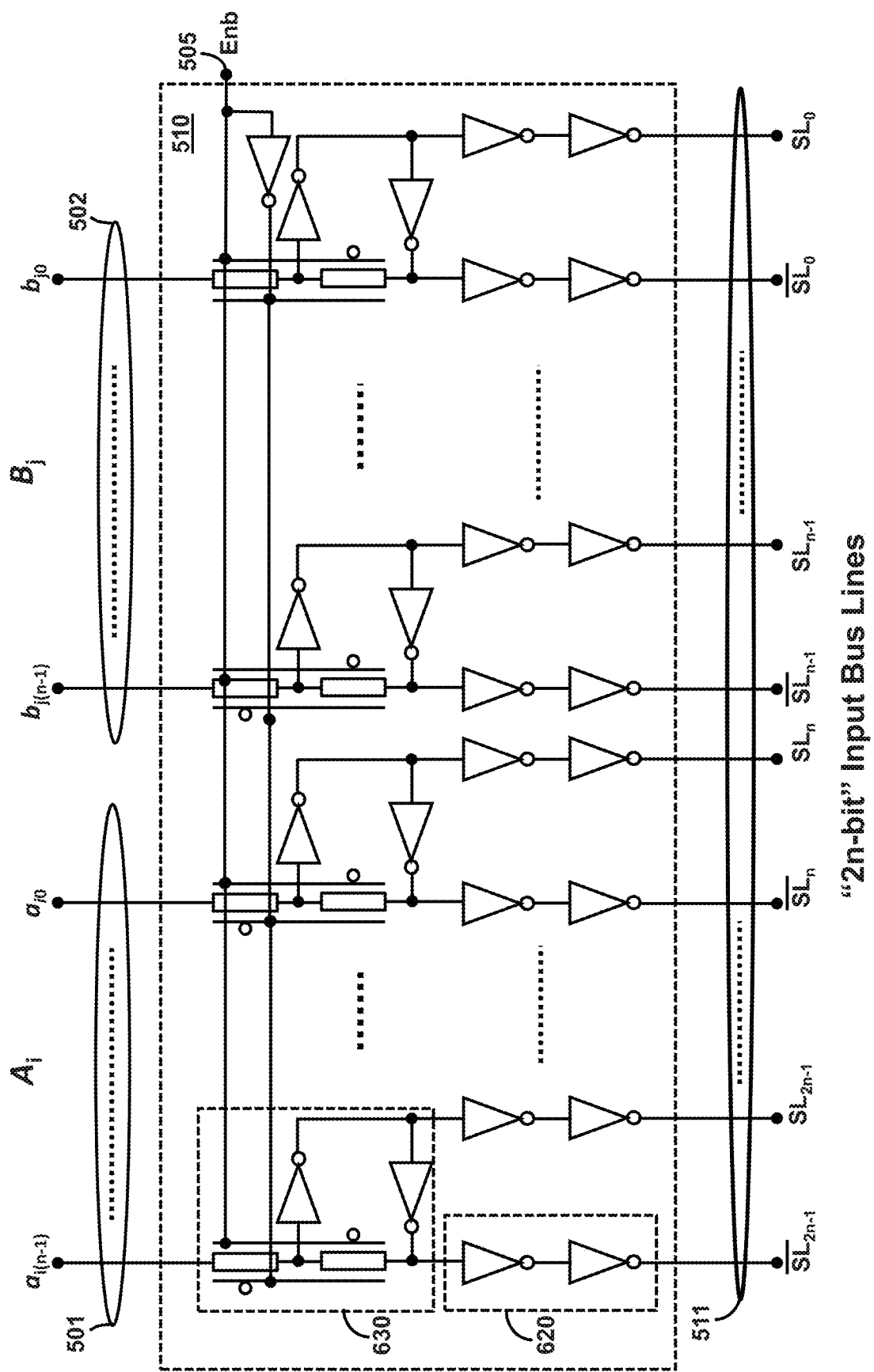
FIG. 6 shows the schematic of the Input Buffer and Driver Unit 510 according to the PDP in-memory multiplier unit in FIG. 5.
Figure 7:
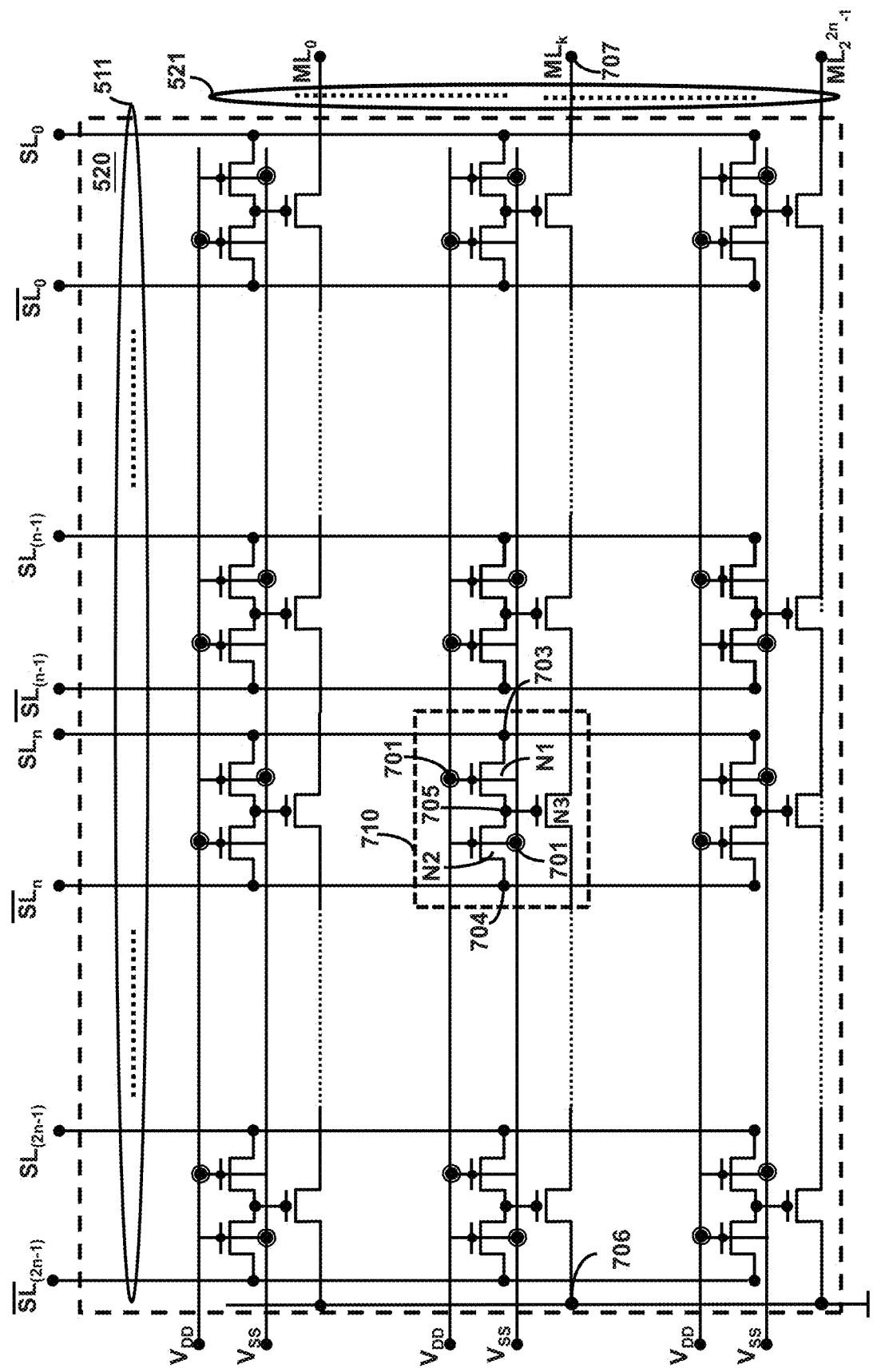
FIG. 7 shows the schematic of 2n-bit by ($2^{2n}$)-row CROM array 520 according to the PDP in-memory multiplier unit in FIG. 5.
Figure 8:
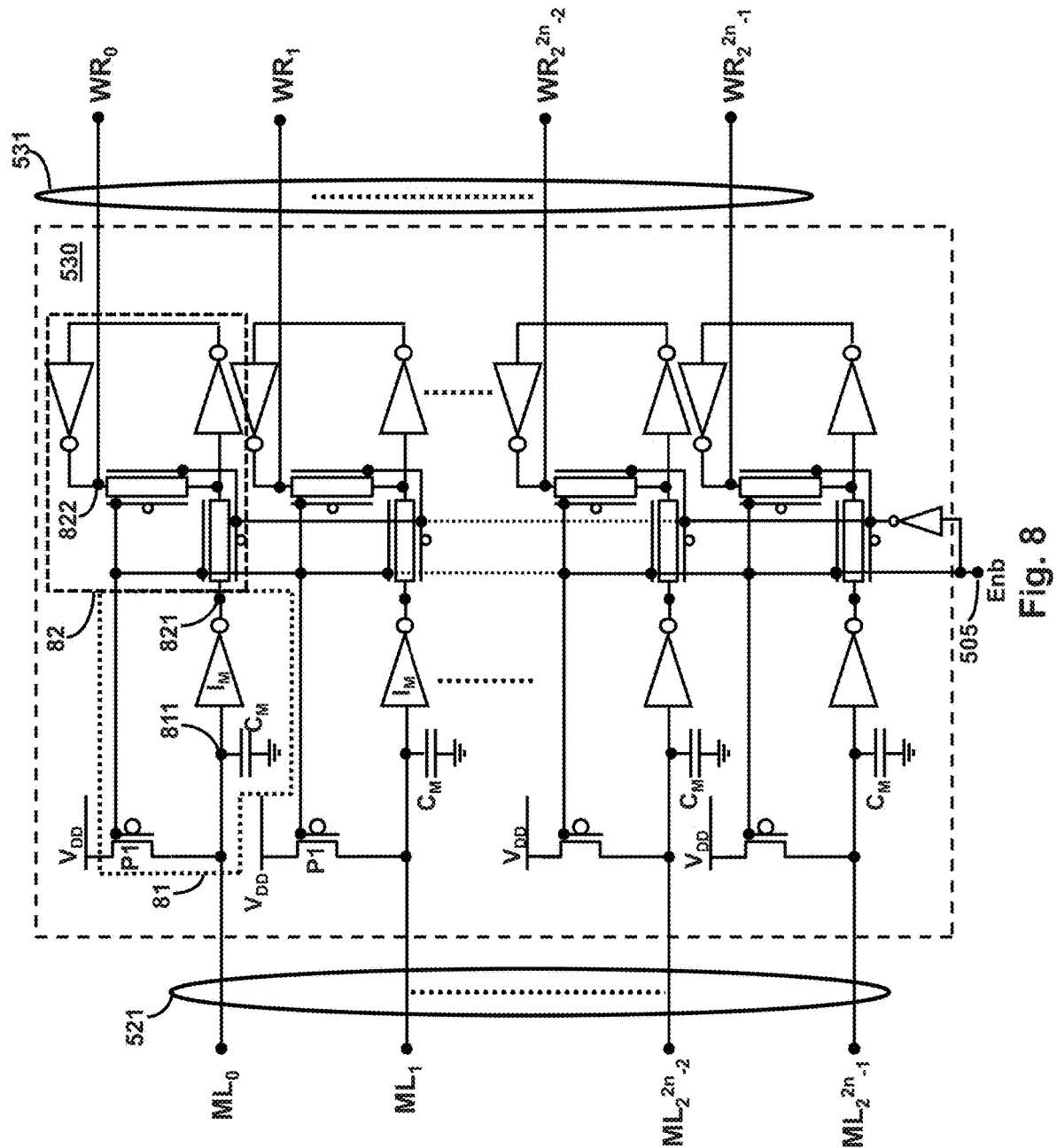
FIG. 8 shows the schematics of Match-Detector Unit 530 according to the PDP in-memory multiplier unit in FIG. 5.
Figure 9:
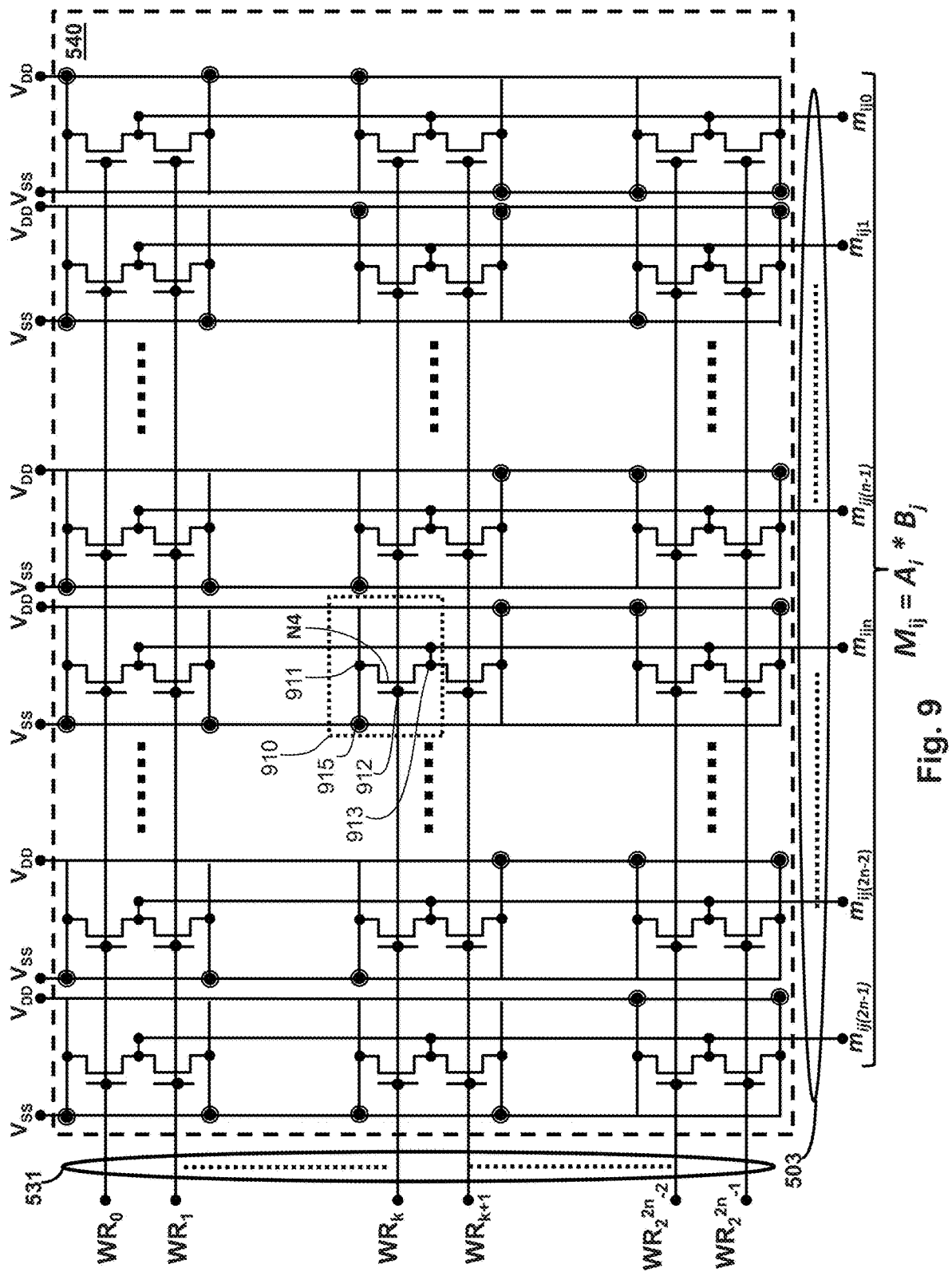
FIG. 9 shows the schematic of the 2n-bit by ($2^{2n}$)-row RROM array 540 according to the PDP in-memory multiplier unit in FIG. 5.
Figure 10:
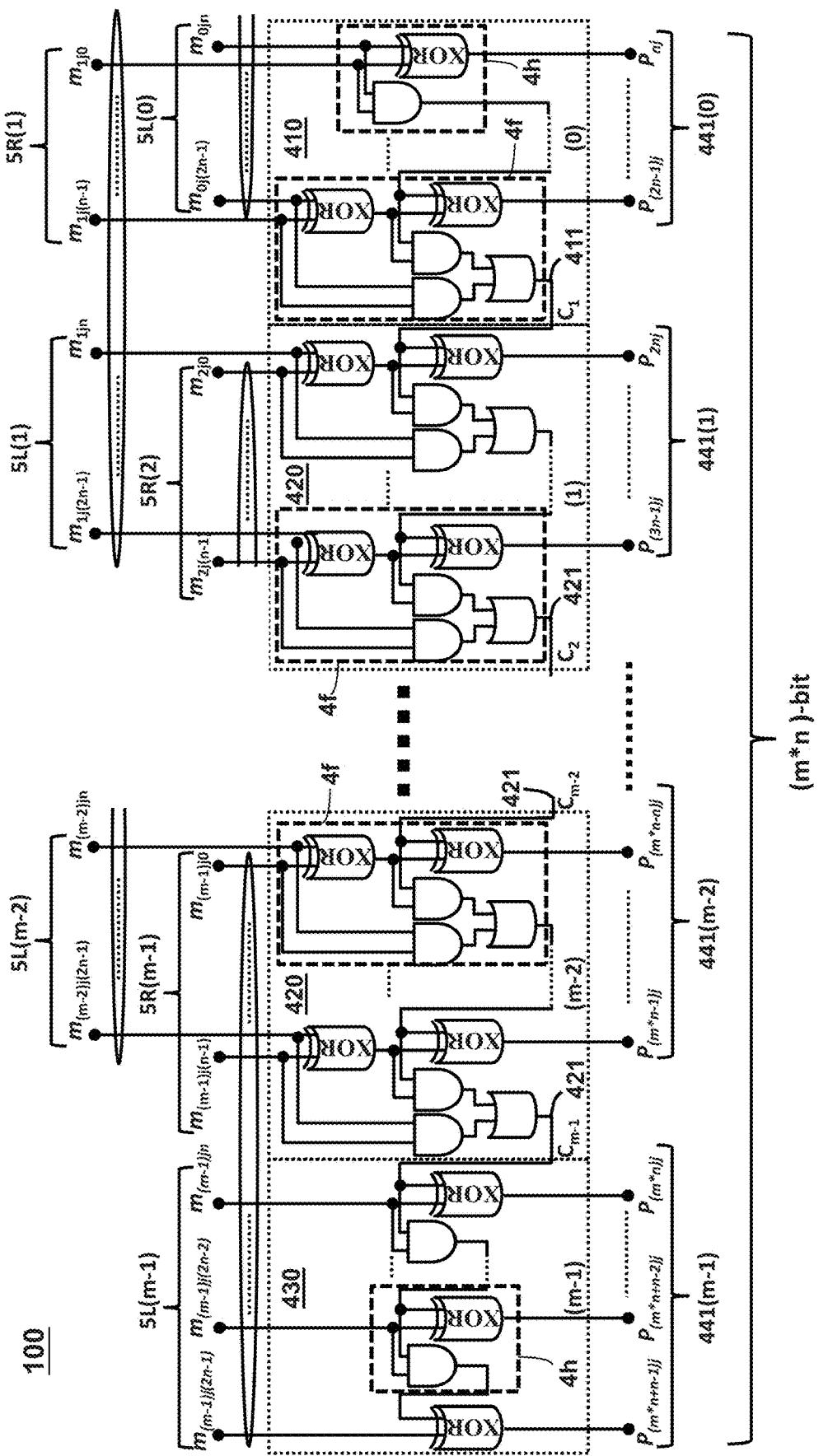
FIG. 10 shows the schematic of a carry-chained binary adder device for the digit/multi-digit multiply polynomial generation according to an embodiment of the invention.
Figure 11:
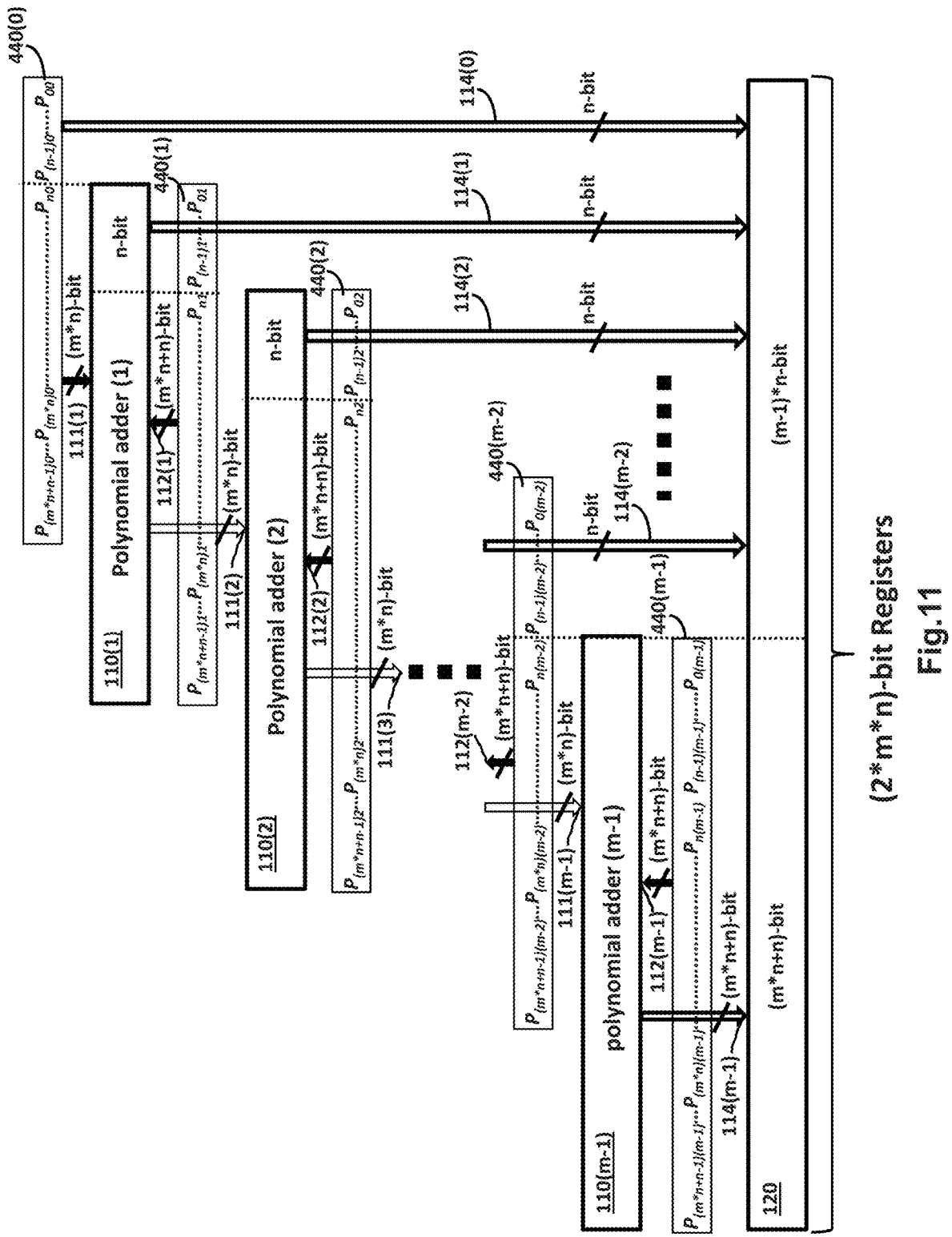
FIG. 11 shows the schematics of digit/multi-digit multiply polynomial additions using m polynomial adders according to the invention.
Figure 12A:
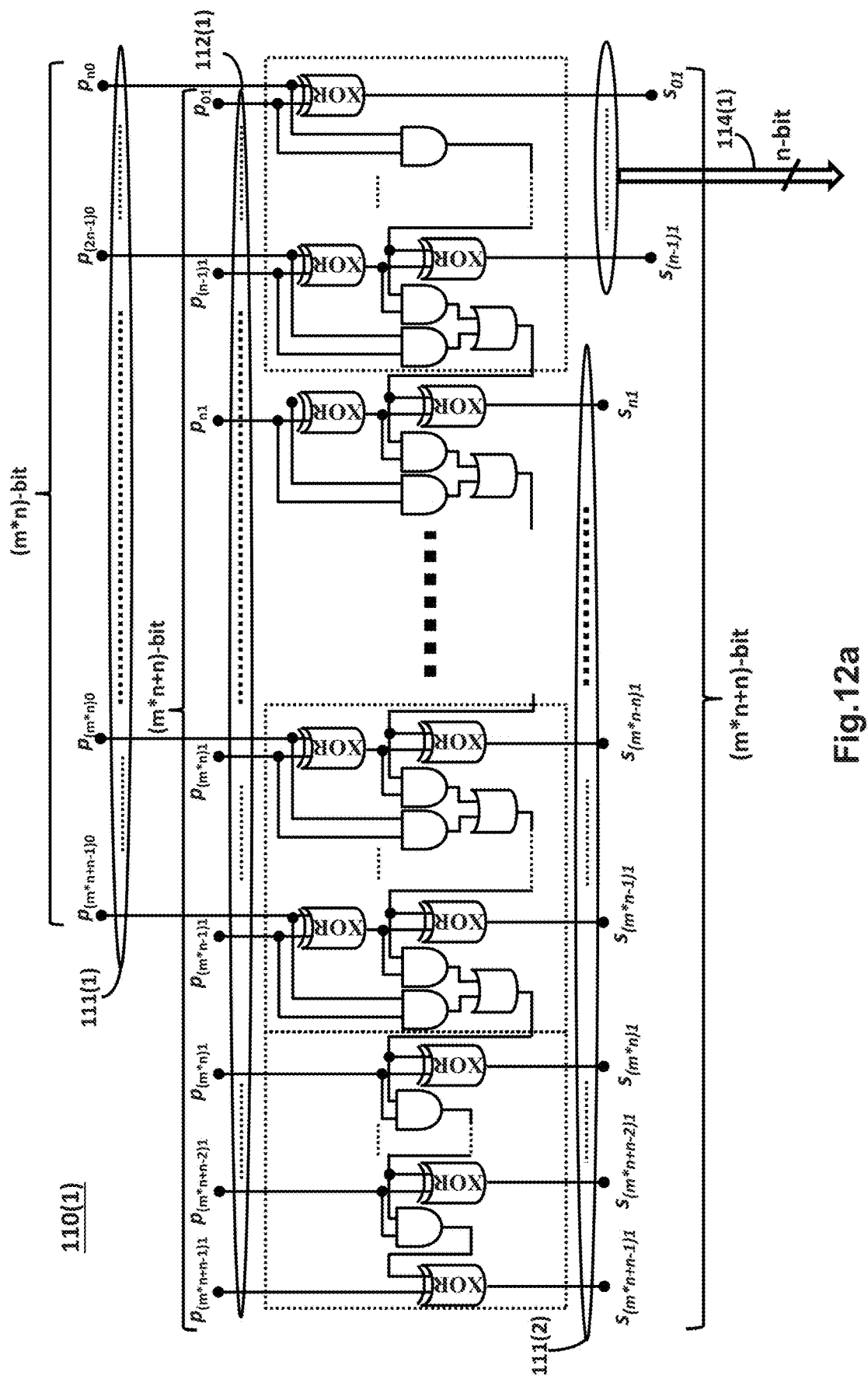
FIG. 12a shows the schematic of the first significant polynomial adder 110(1) with inputs connected with the most significant (m*n)-bit outputs of the first polynomial register unit 440(0) and the (m*n+n)-bit outputs of the second polynomial register unit 440(1) according to an embodiment of the invention.
Figure 12B:
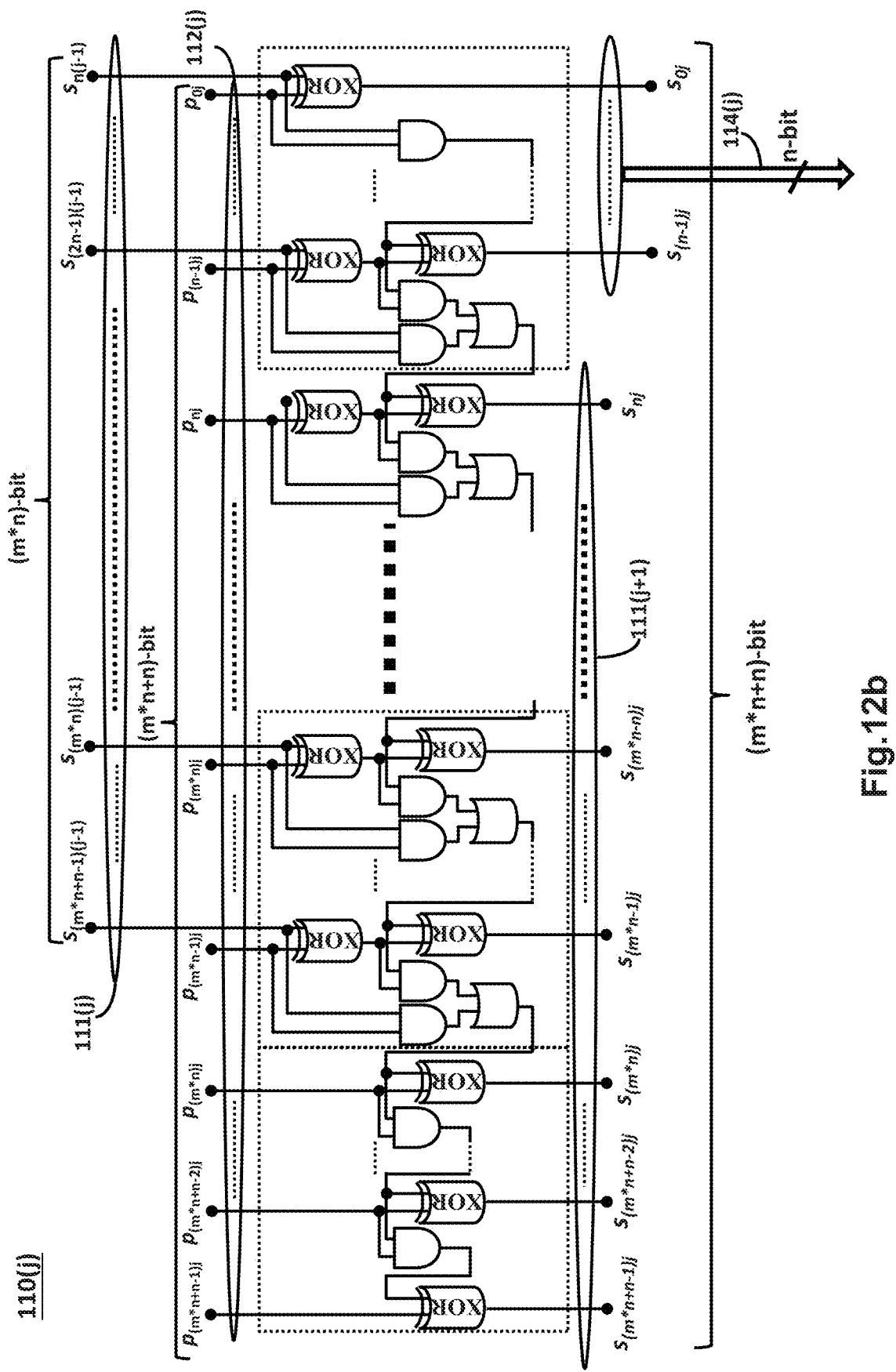
FIG. 12b shows the schematic of the intermediate polynomial adder 110(j) with inputs connected with the most significant (m*n)-bit outputs of the polynomial adder 110(j−1) and the (m*n+n)-bit outputs of the polynomial register unit 440(j) according to an embodiment of the invention.
Figure 12C:
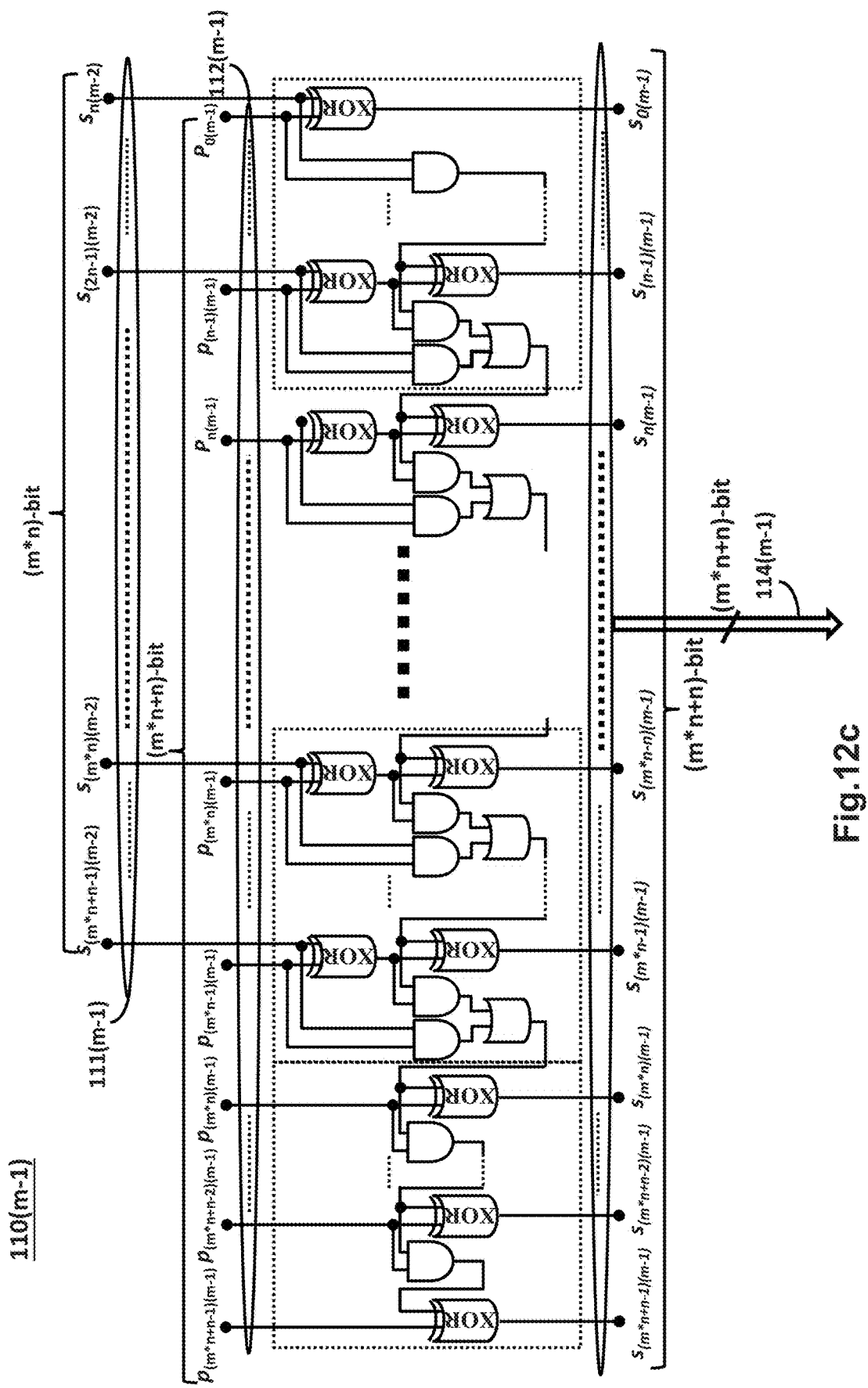
FIG. 12c shows the schematic of the last polynomial adder 110(m−1) with the inputs connected to the most significant (m*n)-bit outputs of the polynomial adder 110(m−2) and the (m*n+n)-bit outputs of the most significant polynomial register unit 440(m−1), and with the (m*n+n)-bit outputs connected to the most significant (m*n+n)-bit registers in the resultant multiplication register unit 120 according to an embodiment of the invention.

The following detailed description is meant to be illustrative only and not limiting. It is to be understood that other embodiment may be utilized and element changes may be made without departing from the scope of the present invention. Also, it is to be understood that the phraseology and terminology used herein are for the purpose of description and should not be regarded as limiting. Those of ordinary skill in the art will immediately realize that the embodiments of the present invention described herein in the context of methods and schematics are illustrative only and are not intended to be in any way limiting. Other embodiments of the present invention will readily suggest themselves to such skilled persons having the benefits of this disclosure.

To illustrate the idea of m-digit base-$2^n$ in-memory multiplication devices for two m-digit base-$2^n$ integer number operands, we apply 4-digit (m=4) base-$2^4$ (n=4) in-memory multiplication devices for two 16-bit binary operands (16-digit by 16-bit multiplication) for the embodiments. The embodiments are for the illustration purpose but shall not be limited to specific numbers of m and n depending on the optimized design environment circumstance for the IC chips. For purposes of clarity and ease of description, hereinafter, in the following examples and embodiments, the same components and/or components with the same function are designated with the same reference numerals.

Figure 13:
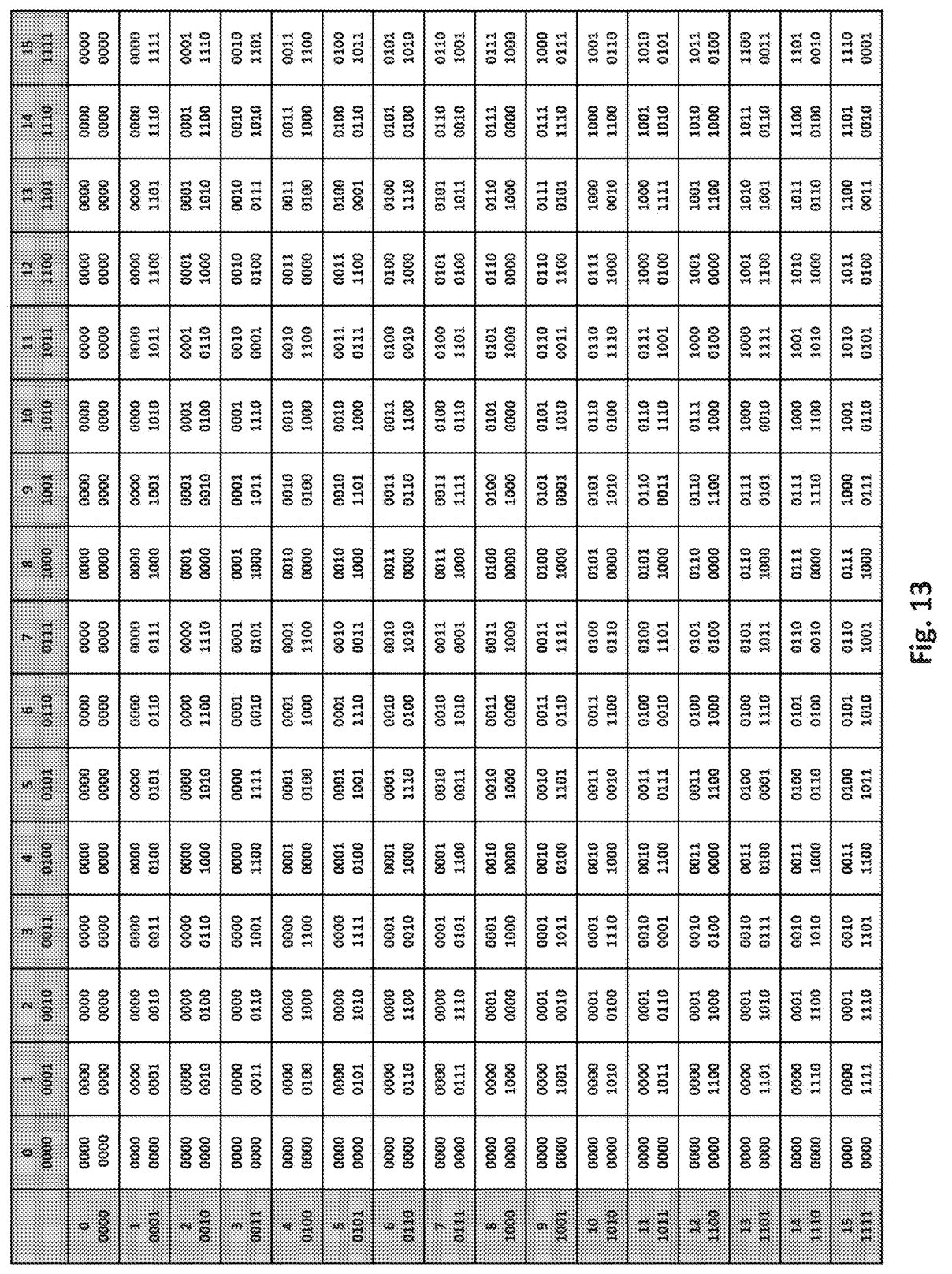

FIG. 13 shows the 4-bit by 4-bit multiplication table, where the first column and first row of the table cells are filled with the 4-bit integer numbers: [0 (0000)b], [1 (0001)b], [2 (0010)b], . . . , [14 (1110)b], [15 (1111)b]. Every cell is filled with the 8-bit binary code of the multiplication results for the number (i−1) in the "$i^{th}$"-column and the integer number (j−1) in the "$j^{th}$"-row. For example, the cell ($3^{rd}$-column and $7^{th}$-row) for [2 (0010)b]*[6 (0110)b] is filled with the number [12 (00001100)b], the cell ($8^{th}$-column and $10^{th}$-row) for [7 (0111)b]*[9 (1001)b] is filled with the number [63 (00111111)b], . . . , and so forth. To apply the 4-bit PDP in-memory multiplier unit 141, we store the binary codes of the two input 4-bit integers (the cells in first row and first column of multiplication table in FIG. 13) into the 256 rows of CROM array 520 and correspondingly store the number 256 of 8-bit product binary codes into the 256 rows of the RROM array 540 according to the 4-bit by 4-bit multiplication table in FIG. 13. Basically, given any inputs of two 4-bit binary integers to the 4-bit PDP in-memory multiplier unit 141, the 4-bit PDP in-memory multiplier unit 141 will output the 8-bit product binary code for their multiplication code.

Figure 14:
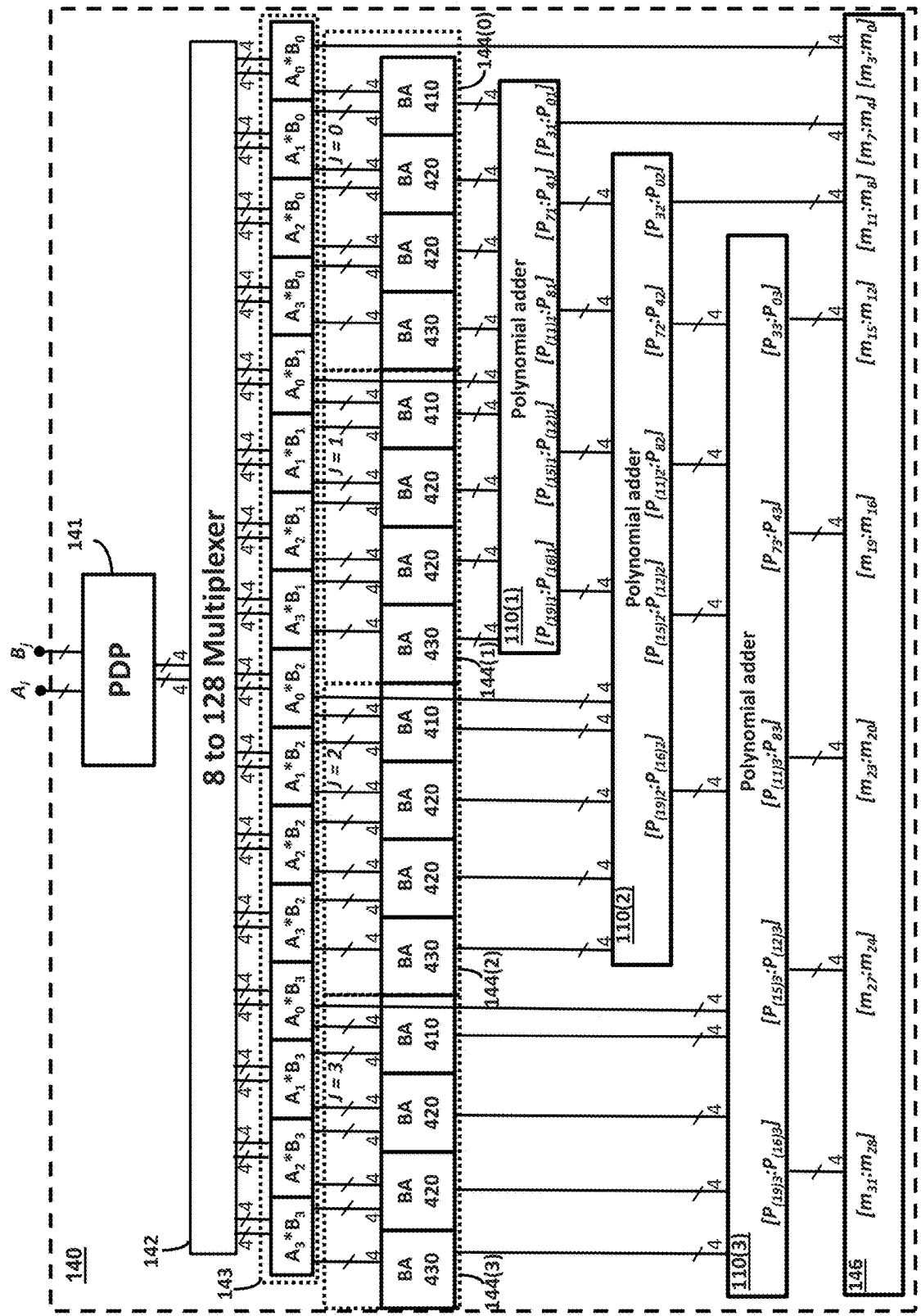
FIG. 14 shows the schematic of four-digit base-$2^n$ in-memory multiplication device with sixteen operational steps according to an embodiment of the invention.

In one embodiment, the schematic of the 4-digit base-$2^4$ (hexadecimal) in-memory multiplication device 140 shown in FIG. 14 comprises a single PDP base-$2^4$ in-memory multiplier unit 141 for obtaining the 8-bit binary multiplication code of two inputted 4-bit operands, an "8 to 128" multiplexer 142 for selecting one of the sixteen sets of 8-bit digit-digit multiply register unit 143 as the outputs, sixteen digit-digit multiply register unit 143 for storing the sixteen sets of digit-digit multiply binary codes, four binary adder devices 144(0), 144(1), 144(2), and 144(3) for the generations of four digit/multi-digit polynomials, three polynomial adders 110(1), 110(2), and 110(3) for the polynomial additions, and one 32-bit resultant multiplication register unit 146 for storing the multiplication resultant code (i.e., the final binary product). Each binary adder device 144(j), for j=0, 1, 2, 3, consists of a 4-bit carry-chained binary adder unit 410, two 4-bit carry-chained binary adder units 420 and a 4-bit carry-chained binary adder unit 430.

The 4-digit base-$2^4$ (hexadecimal) in-memory multiplication device 140 is operated as the following: the "8 to 128" multiplexer 142 is selected to connect the 8-bit outputs of PDP base-$2^4$ in-memory multiplier unit 141 to the designated 8-bit registers in the digit multiply register unit 143 for the inputted digit multiply of $A_i*B_j$ in one operational step for each i, j=0, 1, 2, 3. The process will take sixteen operational steps to fill up the entire 128-bit registers in the digit-digit multiply register unit 143 for the binary codes of the sixteen components of digit multiplications. Meanwhile the data voltage signals of the 128-bit registers in the register unit 143 are propagating to the four binary adder devices 144(0), 144(1), 144(2) and 144(3) for generating the digit/multi-digit polynomial codes along with their least significant 4-bit respectively sent to the inputs of polynomial adders 110(0), 110(1), and 110(2), and to the least significant 4-bit registers [$m_3$:$m_0$] in the 32-bit resultant multiplication register unit 146. The operation of a first binary adder device 144(0) is equivalent to converting 8-bit first coefficients of a first polynomial of degree 3 (i.e., $A_3*B_0X^3+A_2*B_0X^2+*B_0X^1+A_0*B_0X^0$) into 4-bit second coefficients of a second polynomial of degree 4 (i.e., $C_4X^4+C_3X^3+C_2X^2+C_1X^1+C_0X^0$) in mathematics; the operation of a second binary adder device 144(1) is equivalent to converting 8-bit first coefficients of a first polynomial of degree 4 ($A_3*B_1X^4+A_2*+A_1*B_1X^2+A_0*B_1X^1$) into 4-bit second coefficients of a second polynomial of degree 5 ($C_9X^5+C_8X^4+C_7X^3+C_6X^2+C_5X^1$) in mathematics; the operation of a third binary adder device 144(2) is equivalent to converting 8-bit first coefficients of a first polynomial of degree 5 ($A_3*B_2X^5+A_2*B_2X^4+A_1*B_2X^3+A_0*B_2X^2$) into 4-bit second coefficients of a second polynomial of degree 6 ($C_{14}X^6+C_{13}X^5+C_{12}X^4+C_{11}X^3+C_{10}X^2$) in mathematics; the operation of a fourth binary adder device 144(3) is equivalent to converting 8-bit first coefficients of a first polynomial of degree 6 ($A_3*B_3X^6+A_2*B_3X^5+A_1*B_3X^4+A_0*B_3+X^3$) into 4-bit second coefficients of a second polynomial of degree 7 ($C_{19}X^7+C_{18}X^6+C_{17}X^5+C_{16}X^4+C_{15}X^3$) in mathematics, where X=$2^4$. The voltage signals of the digit/multi-digit polynomial codes continue to propagate to the inputs of the three polynomial adders 110(1), 110(2), and 110(3).

Meanwhile with the voltage signals of the 4-bit outputs [$p_{31}$:$p_{01}$] from the first polynomial adder 110(1) sent to the 4-bit registers [$m_7$:$m_4$] in the final 32-bit resultant multiplication registers 146, the voltage signals of 16-bit [$p_{(19)1}$:$p_{41}$] from the first polynomial adder 110(1) propagate to the inputs of the second polynomial adder 110(2). With the voltage signals of the least significant 4-bit outputs [$p_{32}$:$p_{02}$] from the second polynomial adder 110(2) sent to the 4-bit registers [$m_{11}$:$m_8$] in the final 32-bit resultant multiplication registers unit 146, the voltage signals of 16-bit outputs [$p_{(19)2}$:$p_{42}$] from the second polynomial adder 110(2) propagate to the inputs of the third polynomial adder 110(3). Finally the voltage signals of the 20-bit outputs [$p_{(19)3}$:$p_{03}$] from the third polynomial adder 110(3) have reached the 20-bit registers [$m_{31}$:$m_{12}$] in the final 32-bit resultant multiplication register unit 146. The operations of the polynomial adders 110(1)~110(3) are equivalent to lining up and adding like terms of the above second polynomials of degrees ranging from 3 to 7 to obtain third coefficients of a third polynomial of degree 7 in mathematics. Here, the third polynomial has eight terms. After the voltage signals of the entire 32-bit registers are settled the 32-bit multiplication codes for two 16-bit (4-digit hexadecimal) operands A and B are stored in the final 32-bit resultant multiplication register unit 146 as the 16 processing steps for obtaining the sixteen sets of digit-digit multiply with one single PDP in-memory multiplier unit 141.

Figure 15:
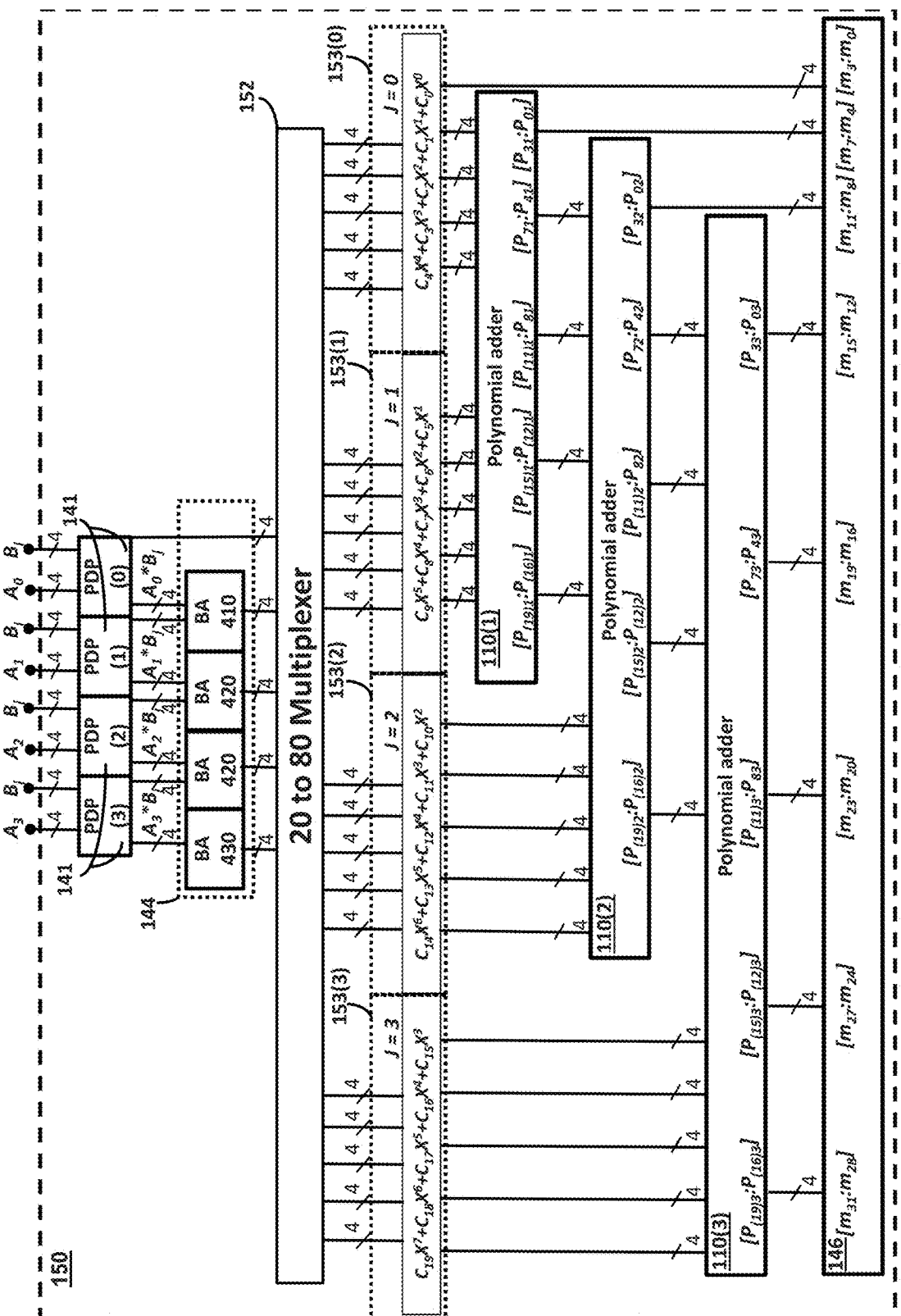
FIG. 15 shows the schematics of four-digit base-$2^n$ in-memory multiplication device with four operational steps operations for the two 16-bit operands according to an embodiment of the invention.

In one embodiment the schematic of the 4-digit base-$2^4$ (hexadecimal) in-memory multiplication device 150 shown in FIG. 15 comprises four PDP base-$2^4$ in-memory multiplier units 141 for obtaining four 8-bit binary multiplication/product codes, a binary adder device 144 for the generations of digit/multi-digit polynomials, an "20 to 80" multiplexer 152 for selecting one of the digit/multi-digit multiply polynomial register units 153, four digit/multi-digit multiply polynomial register units 153(0)~153(3) for storing 80-bit codes (i.e., the second coefficients $C_0$~$C_{19}$ of the second polynomials, each second coefficient having 4 bits) of four digit/multi-digit multiply polynomials, three polynomial adders 110(1), 110(2) and 110(3) for the polynomial additions, and one 32-bit resultant multiplication register unit 146 for storing the final multiplication code.

The 4-digit base-$2^4$ (hexadecimal) in-memory multiplication device 150 is operated as the following: the "20 to 80" multiplexer 152 is selected to connect the 20-bit outputs of the binary adder device 144 with the adder's inputs from the four PDP base-$2^4$ in-memory multiplier units 141 to the inputs of 20-bit registers 153(j), where the 20-bit register unit 153(j) stores the second coefficients of second polynomials of $C_{4+5*j}X^{j+4}+C_{3+5*j}X^{j+3}+C_{2+5*j}X^{j+2}+C_{1+5*j}X^{j+1}+C_{0+5*j}X^j$ for j=0, 1, 2, 3. The process takes four operational steps to fill up the entire 80-bit registers with the binary codes of four digit/multi-digit multiply polynomials (or second coefficients ($C_0$~$C_{19}$) of four second polynomials shown in blocks 153(0)~153(3). The data voltage signals of 80-bit digit/multi-digit polynomial codes (or the twenty second coefficients ($C_0$~$C_{19}$)) in the four polynomial register units 153(0)~153(3) are sent to the inputs of the three polynomial adders 110(1), 110(2), and 110(3), and to the least significant 4-bit inputs of registers $[m_3:m_0]$ in the 32-bit resultant multiplication register unit 146, respectively. Meanwhile the data voltage signals of the most significant 16-bit (i.e, $C_1$~$C_4$) of the first polynomial digit/multi-digit register unit 153(0) are sent into the 16-bit inputs of the first polynomial adder 110(1) along with the least significant 4 bits (i.e, $C_0$) sent to the least significant 4-bit registers $[m_3:m_0]$ in the 32-bit resultant multiplication register unit 146. With the voltage signals of the 4-bit outputs $[p_{31}:p_{01}]$ from the first polynomial adder 110(1) sent to the 4-bit registers $[m_7:m_4]$ in the final 32-bit binary register unit 146, the voltage signals of 16-bit $[p_{(19)1}:p_{41}]$ propagate into the inputs of the second polynomial adder 110(2). With the voltage signals of the 4-bit outputs $[p_{32}:p_{02}]$ from the second polynomial adder 110(2) sent to the 4-bit registers $[m_{11}:m_8]$ in the final 32-bit resultant register unit 146, the voltage signals of 16-bit $[p_{(19)2}:p_{42}]$ propagate into the inputs of the third polynomial adder 110(3). Finally the voltage signals of the 20-bit outputs $[p_{(19)3}:p_{03}]$ from the third polynomial adder 110(3) have reached the 20-bit registers $[m_{31}:m_{12}]$ in the final 32-bit resultant multiplication registers 146. After the voltage signals of the entire 32-bit registers are settled, the 32-bit multiplication codes for two 16-bit (4-digit hexadecimal) operands A and B are stored in the final 32-bit resultant multiplication registers 146 as the 4 processing steps for obtaining four digit/multi-digit multiply polynomials with four PDP in-memory multiplier units 141.

Figure 16:
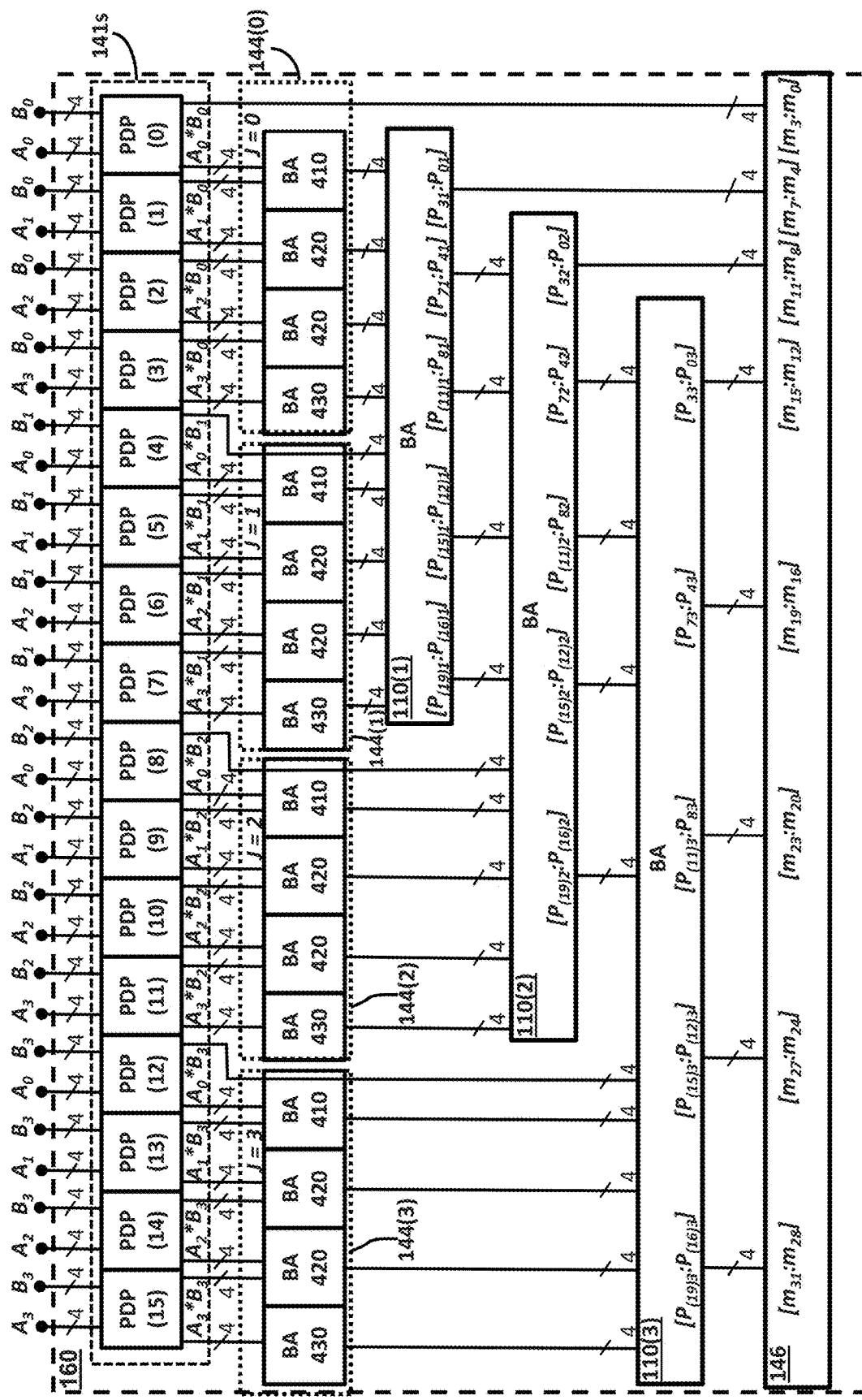
FIG. 16 shows the schematics of four-digit base-$2^n$ in-memory multiplication device with one-operational step according to an embodiment of the invention.

In one embodiment the schematics of the 4-digit base-$2^4$ (hexadecimal) in-memory multiplication device 160 shown in FIG. 16 comprises sixteen PDP base-$2^4$ in-memory multiplier units 141s for simultaneously obtaining 128-bit digit-digit multiply codes, four binary adder devices 144(0), 144(1), 144(2), and 144(3) for the generations of four digit/multi-digit polynomials, three polynomial adders 110(1), 110(2) and 110(3) for the polynomial additions, and one 32-bit resultant multiplication register unit 146 for storing the final multiplication code.

The 4-digit base-$2^4$ (hexadecimal) in-memory multiplication device 160 is operated in one step as the following: the voltage signals of 128-bit digit-digit multiply code is simultaneously generated from the sixteen PDP in-memory multiplier units 141s. With the voltage signals of the least significant 4-bit of the digit-digit multiply code (or the second coefficient ($C_0$) of the second polynomials) sent to the 4-bit of $[m_3:m_0]$ in the 32-bit resultant multiplication register unit 146, the voltage signals of the most significant 124-bit of the digit-digit multiply code is sent to the inputs of four binary adder devices 144(0), 144(1), 144(2), and 144(3) for generating the polynomial codes. The voltage signals of the four digit/multi-digit polynomials (or the second coefficients ($C_1$~$C_{19}$) of the second polynomials) generated by the four binary adder devices 144(0), 144(1), 144(2), and 144(3) then propagate to the inputs of the three polynomial adders 110(1), 110(2), and 110(3). Meanwhile with the voltage signals of the 4-bit outputs $[p_{31}:p_{01}]$ from the first polynomial adder 110(1) sent to the 4-bit registers $[m_7:m_4]$ in the final 32-bit resultant multiplication register unit 146, the voltage signals of 16-bit $[p_{(19)1}:p_{41}]$ from the first polynomial adder 110(1) continue to propagate into the inputs of the second polynomial adder 110(2). With the voltage signals of the 4-bit outputs $[p_{32}:p_{02}]$ from the second polynomial adder 110(2) sent to the 4-bit registers $[m_{11}:m_8]$ in the final 32-bit resultant multiplication registers unit 146, the voltage signals of 16-bit $[p_{(19)2}:p_{42}]$ continue to propagate into the inputs of the third polynomial adder 110(3). Finally the voltage signals of the 20-bit outputs $[p_{(19)3}:p_{03}]$ from the third polynomial adder 110(3) have reached the 20-bit registers $[m_{31}:m_{12}]$ in the final 32-bit resultant multiplication register unit 146. After the voltage signals of the entire 32-bit registers are settled, the 32-bit multiplication codes for two 16-bit (4-digit hexadecimal) operands A and B are stored in the final 32-bit resultant multiplication register unit 146 as the one process step for obtaining the 128-bit digit-digit multiply code from sixteen PDP in-memory multiplier units 141s.

Please note that the above carry-chained binary adder device/unit (100, 410, 420 and 430) are utilized as embodiments and not limitations of the invention. In actual implementations, the above carry-chained binary adder device/unit (100, 410, 420 and 430) can be replaced with any other types of binary adder device/unit, such as Carry Save Adder and Look Ahead Adder, and this also falls in the scope of the invention. Please also note that the above CROM array 520 and the RROM array 540 are utilized as embodiments and not limitations of the invention. In actual implementations, the above CROM array 520 and the RROM array 540 can be replaced with any other types of memory arrays or equivalent logic components, and this also falls in the scope of the invention.

The aforementioned description of the preferred embodiments of the invention has been presented for purposes of illustration and description. It is not intended to be exhaustive or to limit the invention to the precise form or to exemplary embodiment disclosed. Accordingly, the description should be regarded as illustrative rather than restrictive. The embodiment is chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An in-memory multiplication device for performing multiplication on a multiplicand and a multiplier and generating a final product, comprising:
a number P of in-memory multiplier units arranged in a parallel configuration, each comparing a number $2^{2n}$ of hardwired 2n-bit operand symbols with a first n-bit digit and a second n-bit digit respectively selected from the multiplicand and the multiplier to output one of a number $2^{2n}$ of hardwired 2n-bit response symbols as a 2n-bit product code, wherein all the 2n-bit product codes from the number P of in-memory multiplier units form first coefficients of m first polynomials in base $2^{2n}$ and the first coefficients of each first polynomial in base $2^n$ are associated with multiplication of the multiplicand with a corresponding digit of the multiplier, wherein each of the multiplicand and the multiplier has m digits in base $2^n$;
zero or a number Q of binary adder devices arranged in a parallel configuration for converting the 2n-bit first coefficients of the m first polynomials in base $2^n$ into n-bit second coefficients of m second polynomials in base $2^n$ in parallel; and
zero or a number (m−1) of polynomial adders arranged in sequential order and sequentially adding the n-bit second coefficients of the m second polynomials in base $2^n$ in ascending degrees such that like terms of the m second polynomials in base $2^n$ are lined up and added to generate third coefficients of a third polynomial in base $2^n$;
wherein the third coefficients form the final product having 2m digits in base $2^n$; and
wherein P, Q, n and m are integers greater than 0.

2. The in-memory multiplication device according to claim 1, wherein the number $2^{2n}$ of hardwired 2n-bit operand symbols and the number $2^{2n}$ of hardwired 2n-bit response symbols define an n-bit by n-bit multiplication table.

3. The in-memory multiplication device according to claim 1, wherein a number of terms in each first polynomial is m and a highest degree of the m first polynomials is (2m−2), wherein a number of terms in each second polynomial is (m+1) and a highest degree of the m second polynomials is (2m−1), and wherein a number of terms in the third polynomial is 2m and a highest degree of the third polynomial is (2m−1).

4. The in-memory multiplication device according to claim 1, further comprising:
a first register unit coupled to the number (m−1) of polynomial adders for storing the final product, wherein a constant term of the m second polynomials is stored in the first register unit as a least significant digit of the final product.

5. The in-memory multiplication device according to claim 4, wherein the number (m−1) of polynomial adders comprises a least significant polynomial adder, zero or (m−3) intermediate polynomial adders and zero or one most significant polynomial adder, wherein the least significant polynomial adder lines up and adds the n-bit second coefficients of m larger degree terms of the second polynomial of degree m and all the n-bit second coefficients of a second polynomial of degree (m+1) to obtain sum coefficients of a sum polynomial of degree (m+1) and propagates the sum coefficient of a smallest degree term of the sum polynomial of degree (m+1) to the first register unit, wherein when m>=4, each of the (m−3) intermediate polynomial adders lines up and adds the sum coefficients of m larger degree terms of the sum polynomial of degree j and all the n-bit second coefficients of the second polynomial of degree (j+1) to obtain sum coefficients of a sum polynomial of degree (j+1) and propagates the sum coefficient of a smallest degree term of the sum polynomial of degree (j+1) to the first register unit, where j is increased from (m+1) to (2m−3), wherein the most significant polynomial adder lines up and adds the sum coefficients of m larger degree terms of the sum polynomial of degree (2m−2) and all the n-bit second coefficients of the second polynomial of degree (2m−1) to obtain the sum coefficients of a sum polynomial of degree (2m−1) and wherein all the sum coefficients of the sum polynomial of degree (2m−1) are propagated to the first register unit.

6. The in-memory multiplication device according to claim 1, wherein each binary adder device comprises (m−1) n-bit adders and n half adders in a carry-chained configuration, wherein a least significant digit of the first coefficient of the smallest degree term in the first polynomial of degree k is assigned to the n-bit second coefficient of a smallest degree term in a corresponding second polynomial of degree (k+1), where k is increased from (m−1) to (2m−2) and m>=2.

7. The in-memory multiplication device according to claim 6, wherein a least significant n-bit adder of the (m−1) n-bit adders adds a least significant digit of the first coefficient of a second smallest degree term and a most significant digit of the first coefficient of the smallest degree term in the first polynomial of degree k to produce a carry digit and the n-bit second coefficient of the second smallest degree term in the corresponding second polynomial of degree (k+1), wherein a corresponding n-bit adder (i) of the (m−1) n-bit adders adds a carry digit from a less significant n-bit adder, the least significant digit of the first coefficient of a target term ($i^{th}$) and the most significant digit of the first coefficient in its immediately-previous-degree term ($(i−1)^{th}$) in the first polynomial of degree k to produce a carry digit and the n-bit second coefficient of the corresponding term ($i^{th}$) in the corresponding second polynomial of degree (k+1), where i is increased from 2 to (m−1), and wherein the n half adders adds a carry digit from a most significant n-bit adder and a most significant digit of the first coefficient of a largest degree term in the first polynomial of degree k to produce the n-bit second coefficient of a largest degree term in the corresponding second polynomial of degree (k+1).

8. The in-memory multiplication device according to claim 1, wherein each in-memory multiplier unit comprises:
a first read-only-memory (ROM) array comprising $2^{2n}$ rows by 2n columns of first memory cells for parallel comparing the first n-bit digit and the second n-bit digit with the number $2^{2n}$ of 2n-bit operand symbols hardwired in the $2^{2n}$ rows of first memory cells, wherein each row of the first memory cells generates an indication signal indicative of whether the first n-bit digit and the second n-bit digit match its hardwired 2n-bit operand symbol;
a detection circuit for respectively applying a number $2^{2n}$ of switching signals to a number $2^{2n}$ of wordlines of a second ROM array in response to a number $2^{2n}$ of indication signals; and
the second ROM array comprising $2^{2n}$ rows by 2n columns of second memory cells, wherein the number $2^{2n}$ of 2n-bit response symbols are respectively hardwired in the $2^{2n}$ rows of second memory cells;

wherein while receiving an activated switching signal, a row of second memory cells is switched on to output its hardwired 2n-bit response symbol as the 2n-bit product code.

9. The in-memory multiplication device according to claim 1, further comprising:
a number m of second register units coupled between the number P of in-memory multiplier units and the number Q of binary adder devices for respectively storing the first coefficients of the m first polynomials in base $2^n$, wherein P=1 and Q=m.

10. The in-memory multiplication device according to claim 1, further comprising:
a number m of second register units coupled between the number Q of binary adder devices and the number (m−1) of polynomial adders for respectively storing the n-bit second coefficients of the m second polynomials in base $2^n$, wherein P=m and Q=1.

11. The in-memory multiplication device according to claim 1, wherein P=$m^2$ and Q=m.

12. An operating method of an in-memory multiplication device that performs multiplication on a multiplicand and a multiplier to generate a final product, the in-memory multiplication device comprising a single in-memory multiplier unit, a first register unit, a second register unit, a number m of binary adder devices and zero or a number (m−1) of polynomial adders, the method comprising the steps of:
comparing a first n-bit digit and a second n-bit digit respectively selected from the multiplicand and the multiplier with a number $2^{2n}$ of 2n-bit operand symbols hardwired in a first read-only-memory (ROM) array to output one of a number $2^{2n}$ of 2n-bit response symbols hardwired in a second ROM array as a 2n-bit product code and store the 2n-bit product code in the first register unit by the single in-memory multiplier unit comprising the first ROM array and the second ROM array;
repeating the step of comparing until all digits of the multiplicand and the multiplier are processed and a number $m^2$ of 2n-bit product codes are stored in the first register unit, wherein the number $m^2$ of 2n-bit product codes serve as first coefficients of m first polynomials in base $2^n$, wherein the first coefficients of each first polynomial in base $2^n$ are associated with multiplication of the multiplicand with a corresponding digit of the multiplier;
when m>=2, sequentially adding a most significant digit of the first coefficient of a less degree term and a least significant digit of the first coefficient of a larger degree term adjacent to the less degree term for each first polynomial from the first register unit in ascending degree by each binary adder device comprising (m−1) n-bit adders and n half adders in a carry-chained configuration so that the 2n-bit first coefficients of the m first polynomials in base $2^n$ are converted into n-bit second coefficients of m second polynomials in base $2^n$ in parallel, wherein the number m of binary adder devices are arranged in a parallel configuration; and
when m>=2, sequentially adding the m second polynomials in base $2^n$ in ascending degrees by the number (m−1) of polynomial adders arranged in sequential order such that like terms of the m second polynomials in base $2^n$ are lined up and added to generate and store a final product having 2m digits in base $2^n$ in the second register unit, wherein each polynomial adder comprises a (m×n)-bit adder and n half adders in a carry-chained configuration;

wherein each of the multiplicand and the multiplier has m digits in base $2^n$ and both n and m are integers greater than 0.

13. The operating method according to claim 12, wherein the number $2^{2n}$ of 2n-bit operand symbols hardwired in the first ROM array and the number $2^{2n}$ of 2n-bit response symbols hardwired in the second ROM array define an n-bit by n-bit multiplication table.

14. The operating method according to claim 12, wherein a number of terms in each first polynomial is m and a highest degree for the m first polynomials is (2m−2), wherein a number of terms in each second polynomial is (m+1) and a highest degree for the m second polynomials is (2m−1).

15. The operating method according to claim 12, wherein the step of sequentially adding the most significant digit comprises:
at a binary adder device (k−3) of the number m of binary adder devices,
(1) adding a least significant digit of the first coefficient of a second smallest degree term and a most significant digit of the first coefficient of a smallest degree term in the first polynomial of degree k from the first register unit to produce a carry digit and the n-bit second coefficient of the second smallest degree term in the corresponding second polynomial of degree (k+1) by a least significant n-bit adder of the (m−1) n-bit adders;
(2) adding a carry digit from its less significant n-bit adder, the least significant digit of the first coefficient of a target term ($i^{th}$) and the most significant digit of the first coefficient of its immediately-previous term ($(i−1)^{th}$) in the first polynomial of degree k from the first register unit to produce a carry digit and the n-bit second coefficient of a corresponding term ($i^{th}$) in its corresponding second polynomial of degree (k+1) by a corresponding n-bit adder of the (m−1) n-bit adders;
(3) repeating step (2) until the (m−1) n-bit adders are completed, where i is increased from 2 to (m−1); and
(4) adding a carry digit from its less a most significant n-bit adder and a most significant digit of the first coefficient of a largest degree term in the first polynomial of degree k to produce the n-bit second coefficient of a largest degree term in the corresponding second polynomial of degree (k+1) by the n half adders,
where k is increased ranges from (m−1) to (2m−2).

16. The operating method according to claim 12, wherein the step of sequentially adding the m second polynomials comprises:
(a) storing a constant term of the second polynomial of degree m as a least significant digit of the final product in the second register unit;
(b) lining up and adding the n-bit second coefficients of m larger degree terms of the second polynomial of degree m and all the n-bit second coefficients of a second polynomial of degree (m+1) by a least significant polynomial adder of the number (m−1) of polynomial adders to obtain sum coefficients of a sum polynomial of degree (m+1) and store the sum coefficient of a smallest degree term of the sum polynomial of degree (m+1) as the second least significant digit of the final product in the second register unit;
(c) when m>=4, lining up and adding the sum coefficients of m larger degree terms of the sum polynomial of degree j and all the n-bit second coefficients of the second polynomial of degree (j+1) by a corresponding polynomial adder of the number (m−1) of polynomial adders to obtain sum coefficients of a sum polynomial of degree (j+1) and store the sum coefficient of a smallest degree term of the sum polynomial of degree (j+1) as a corresponding digit of the final product in the second register unit;
(d) when m>=4, repeating step (c) until a total of (m−2) polynomial adders out of the number (m−1) of polynomial adders are completed, where j is increased from (m+1) to (2m−3); and
(e) when m>=3, lining up and adding the sum coefficients of m larger degree terms of the sum polynomial of degree (2m−2) and all the n-bit second coefficients of the second polynomial of degree (2m−1) by a most significant polynomial adder of the number (m−1) of polynomial adders to obtain and store all the sum coefficients of a sum polynomial of degree (2m−1) as the (m+1) most significant digits of the final product in the second register unit.

17. The operating method according to claim 12, wherein the step of comparing comprises:
parallel comparing the first n-bit digit and the second n-bit digit with the number $2^{2n}$ of 2n-bit operand symbols hardwired in the first ROM array comprising $2^{2n}$ rows by 2n columns of first memory cells so that each row of first memory cells generates an indication signal indicative of whether the first n-bit digit and the second n-bit digit match its hardwired 2n-bit operand symbol;
respectively applying a number $2^n$ of switching signals to a number $2^{2n}$ of wordlines in the second ROM array comprising $2^{2n}$ rows by 2n columns of second memory cells according to a number $2^{2n}$ of indication signals, wherein the number $2^{2n}$ of 2n-bit response symbols are hardwired in the $2^{2n}$ rows of second memory cells; and
switching on a row of second memory cells to output its hardwired 2n-bit response symbol as the 2n-bit product code in response to a received activated switching signal.

18. An operating method of an in-memory multiplication device that performs multiplication on a multiplicand and a multiplier to generate a final product, the in-memory multiplication device comprising a number m of in-memory multiplier units in a parallel configuration, a first register unit, a second register unit, a binary adder device and zero or a number (m−1) of polynomial adders, the method comprising the steps of:
comparing a first n-bit digit and a second n-bit digit respectively selected from the multiplicand and the multiplier with a number $2^{2n}$ of 2n-bit operand symbols hardwired in a first read-only-memory (ROM) array to output one of a number $2^{2n}$ of 2n-bit response symbols hardwired in a second read-only-memory (ROM) array as a 2n-bit product code by each in-memory multiplier unit comprising the first ROM array and the second ROM array so that a number m of 2n-bit product codes are outputted in parallel from the number m of in-memory multiplier units, wherein the number m of 2n-bit product codes serve as 2n-bit first coefficients of one of m first polynomials in base $2^n$ and are associated with multiplication of the multiplicand with the second n-bit digit of the multiplier;
when m>=2, sequentially adding a least significant digit of the first coefficient of a less degree term and a most significant digit of the first coefficient of a larger degree term adjacent to the less degree term in the one first polynomial in ascending degree by the binary adder device comprising (m−1) n-bit adders and n half adders in a carry-chained configuration to convert the 2n-bit first coefficients of the one first polynomial in base $2^n$ into n-bit second coefficients of a corresponding second polynomial in base $2^n$ and store the n-bit second coefficients of the corresponding second polynomial in base $2^n$ in the first register unit;
repeating steps of comparing and converting until all the digits of the multiplier are selected and all the n-bit second coefficients of m second polynomials in base $2^n$ are stored in the first register unit; and
when m>=2, sequentially adding the m second polynomials in base $2^n$ in ascending degrees by the number (m−1) of polynomial adders arranged in sequential order such that like terms of the m second polynomials in base $2^n$ are lined up and added to generate and store the final product having 2m digits in base $2^n$ in the second register unit;
wherein each polynomial adder comprises a m-bit adder and n half adders in a carry-chained configuration; and
wherein each of the multiplicand and the multiplier has m digits in base $2^n$ and both n and m are integers greater than 0.

19. The operating method according to claim 18, wherein the number $2^{2n}$ of 2n-bit operand symbols hardwired in the first ROM array and the number $2^{2n}$ of 2n-bit response symbols hardwired in the second ROM array define a n-bit by n-bit multiplication table.

20. The operating method according to claim 18, wherein a number of terms in each first polynomial is m and a highest degree for the m first polynomials is (2m−2), wherein a number of terms in each second polynomial is (m+1) and a highest degree for the m second polynomials is (2m−1).

21. The operating method according to claim 18, wherein the step of sequentially adding the least significant digit comprises:
(1) storing a least significant digit of the first coefficient of a smallest degree term in the one first polynomial of degree k as the n-bit second coefficient of a smallest degree term in a corresponding second polynomial of degree (k+1) in the first register unit;
(2) adding a least significant digit of the first coefficient of a second smallest degree term and a most significant digit of the first coefficient of the smallest degree term in the one first polynomial of degree k to produce a carry digit and store the n-bit second coefficient of the second smallest degree term in the corresponding second polynomial of degree (k+1) in the first register unit by a least significant n-bit adder of the (m−1) n-bit adders;
(3) adding a carry digit from its less significant n-bit adder, the least significant digit of the first coefficient of a target term ($i^{th}$) and the most significant digit of the first coefficient of its immediately-previous term (($i-1)^{th}$) in the one first polynomial of degree k to produce a carry digit and store the n-bit second coefficient of a corresponding term ($i^{th}$) in its corresponding second polynomial of degree (k+1) in the first register unit by a corresponding n-bit adder of the (m−1) n-bit adders;
(4) repeating step (3) until the (m−1) n-bit adders are completed, where i is increased from 2 to (m−1); and
(5) adding a carry digit from a most significant n-bit adder and the most significant digit of the first coefficient of a largest degree term in the one first polynomial of degree k to produce and store the n-bit second coefficient of a largest degree term in the corresponding

19 second polynomial of degree (k+1) in the first register unit by the n half adders, where k ranges from (m−1) to (2m−2).

22. The operating method according to claim 18, wherein the step of sequentially adding the m second polynomials comprises:
(a) storing a constant term of the second polynomial of degree m as a least significant digit of the final product in the second register unit;
(b) lining up and adding the n-bit second coefficients of m larger degree terms of the second polynomial of degree m and all the n-bit second coefficients of a second polynomial of degree (m+1) by a least significant polynomial adder of the number (m−1) of polynomial adders to obtain sum coefficients of a sum polynomial of degree (m+1) and store the sum coefficient of a smallest degree term of the sum polynomial of degree (m+1) as the second least significant digit of the final product in the second register unit;
(c) when m>=4, lining up and adding the sum coefficients of m larger degree terms of the sum polynomial of degree j and all the n-bit second coefficients of the second polynomial of degree (j+1) by a corresponding polynomial adder of the number (m−1) of polynomial adders to obtain sum coefficients of a sum polynomial of degree (j+1) and store the sum coefficient of a smallest degree term of the sum polynomial of degree (j+1) as a corresponding digit of the final product in the second register unit;
(d) when m>=4, repeating step (c) until a total of (m−2) polynomial adders out of the number (m−1) of polynomial adders are completed, where j is increased from (m+1) to (2m−3); and
(e) when m>=3, lining up and adding the sum coefficients of m larger degree terms of the sum polynomial of degree (2m−2) and all the n-bit second coefficients of the second polynomial of degree (2m−1) by a most significant polynomial adder of the number (m−1) of polynomial adders to obtain and store all the sum coefficients of a sum polynomial of degree (2m−1) as the (m+1) most significant digits of the final product in the second register unit.

23. The operating method according to claim 18, wherein the step of comparing comprises:
parallel comparing the first n-bit digit and the second n-bit digit with the number $2^{2n}$ of 2n-bit operand symbols hardwired in the first ROM array comprising $2^{2n}$ rows by 2n columns of first memory cells so that each row of first memory cells generates an indication signal indicative of whether the first n-bit digit and the second n-bit digit match its hardwired 2n-bit operand symbol;
respectively applying a number $2^{2n}$ of switching signals to a number $2^{2n}$ of wordlines in the second ROM array comprising $2^{2n}$ rows by 2n columns of second memory cells according to a number $2^{2n}$ of indication signals, wherein the number $2^{2n}$ of 2n-bit response symbols are hardwired in the $2^{2n}$ rows of second memory cells; and
switching on a row of second memory cells to output its hardwired 2n-bit response symbol as a 2n-bit product code in response to a received activated switching signal.

24. An operating method of an in-memory multiplication device that performs multiplication on a multiplicand and a multiplier to generate a final product, the in-memory multiplication device comprising a number $m^2$ of in-memory multiplier units, a number m of binary adder devices, a

20 register unit and zero or a number (m−1) of polynomial adders, the method comprising the steps of:
comparing a first n-bit digit and a second n-bit digit respectively selected from the multiplicand and the multiplier with a number $2^{2n}$ of 2n-bit operand symbols hardwired in a first read-only-memory (ROM) array to output one of a number $2^{2n}$ of 2n-bit response symbols hardwired in a second ROM array as a 2n-bit product code by each in-memory multiplier unit comprising the first ROM array and the second ROM array so that a number $m^2$ of 2n-bit product codes are outputted in parallel from the number $m^2$ of in-memory multiplier units, wherein the number $m^2$ of 2n-bit product codes serve as first coefficients of a number m of first polynomials in base $2^n$ and the first coefficients of each first polynomial in base $2^n$ are associated with multiplication of the multiplicand with a corresponding digit of the multiplier;
when m>=2, sequentially adding a most significant digit of the first coefficient of a less degree term and a least significant digit of the first coefficient of a larger degree term adjacent to the less degree term for each first polynomial in ascending degree by each binary adder device comprising (m−1) n-bit adders and n half adders in a carry-chained configuration so that the 2n-bit first coefficients of the m first polynomials in base $2^n$ are converted into n-bit second coefficients of m second polynomials in base $2^n$ in parallel by the m binary adder devices; and
when m>=2, sequentially adding the m second polynomials in base $2^n$ in ascending degrees by the number (m−1) of polynomial adders arranged in sequential order such that like terms of the m second polynomials in base $2^n$ are lined up and added to generate and store a final product having 2m digits in base $2^n$ in the register unit, wherein each polynomial adder comprises a (m×n)-bit adder and n half adders in a carry-chained configuration;
wherein the number $m^2$ of in-memory multiplier units and the number m of binary adder devices are respectively arranged in a parallel configuration and each of the multiplicand and the multiplier has m digits in base $2^n$ and both n and m are integers greater than 0.

25. The operating method according to claim 24, wherein the number $2^{2n}$ of 2n-bit operand symbols hardwired in the first ROM array and the number $2^{2n}$ of 2n-bit product symbols hardwired in the second ROM array define a n-bit by n-bit multiplication table.

26. The operating method according to claim 24, wherein a number of terms in each first polynomial is m and a highest degree for the m first polynomials is (2m−2), wherein a number of terms in each second polynomial is (m+1) and a highest degree for the m second polynomials is (2m−1).

27. The operating method according to claim 24, wherein the step of sequentially adding the most significant digit comprises:
at a binary adder device (k−3) of the number m of binary adder devices,
(1) adding a least significant digit of the first coefficient of a second smallest degree term and a most significant digit of the first coefficient of a smallest degree term in the first polynomial of degree k to produce a carry digit and the n-bit second coefficient of the second smallest degree term in the corresponding second polynomial of degree (k+1) by a least significant n-bit adder of the (m−1) n-bit adders;

(2) adding a carry digit from its less significant n-bit adder, the least significant digit of the first coefficient of a target term ($i^{th}$) and the most significant digit of the first coefficient of its immediately-previous term (($i-1$)$^{th}$) in the first polynomial of degree k to produce a carry digit and the n-bit second coefficient of a corresponding term ($i^{th}$) in its corresponding second polynomial of degree (k+1) by a corresponding n-bit adder of the (m−1) n-bit adders;

(3) repeating step (2) the (m−1) n-bit adders are completed, where i is increased from 2 to (m−1); and (4) adding a carry digit from its less a most significant n-bit adder and a most significant digit of the first coefficient of a largest degree term in the first polynomial of degree k to produce the n-bit second coefficient of a largest degree term in the corresponding second polynomial of degree (k+1) by the n half adders, where k ranges from (m−1) to (2m−2).

28. The operating method according to claim 24, wherein the step of sequentially adding the m second polynomials comprises:

(a) storing a constant term of the second polynomial of degree m to as a least significant digit of the final product in the register unit;

(b) lining up and adding the n-bit second coefficients of m larger degree terms of the second polynomial of degree m and all the n-bit second coefficients of a second polynomial of degree (m+1) by a least significant polynomial adder of the number (m−1) of polynomial adders to obtain sum coefficients of a sum polynomial of degree (m+1) and store the sum coefficient of a smallest degree term of the sum polynomial of degree (m+1) as the second least significant digit of the final product in the register unit;

(c) when m>=4, lining up and adding the sum coefficients of m larger degree terms of the sum polynomial of degree j and all the n-bit second coefficients of the second polynomial of degree (j+1) by a corresponding polynomial adder of the number (m−1) of polynomial adders to obtain sum coefficients of a sum polynomial of degree (j+1) and store the sum coefficient of a smallest degree term of the sum polynomial of degree (j+1) as a corresponding digit of the final product in the register unit;

(d) when m>=4, repeating step (c) until a total of (m−2) polynomial adders out of the number (m−1) of polynomial adders are completed, where j is increased from (m+1) to (2m−3); and (e) when m>=3, lining up and adding the sum coefficients of m larger degree terms of the sum polynomial of degree (2m−2) and all the n-bit second coefficients of the second polynomial of degree (2m−1) by a most significant polynomial adder of the number (m−1) of polynomial adders to obtain and store all the sum coefficients of a sum polynomial of degree (2m−1) as the (m+1) most significant digits of the final product in the register unit.

29. The operating method according to claim 24, wherein the step of comparing comprises:

parallel comparing the first n-bit digit and the second n-bit digit with the number $2^{2n}$ of 2n-bit operand symbols hardwired in the first ROM array comprising $2^{2n}$ rows by 2n columns of first memory cells so that each row of first memory cells generates an indication signal indicative of whether the first n-bit digit and the second n-bit digit match its hardwired 2n-bit operand symbol;

respectively applying a number $2^{2n}$ of switching signals to a number $2^{2n}$ of wordlines in the second ROM array comprising $2^{2n}$ rows by 2n columns of second memory cells according to a number $2^{2n}$ of indication signals, wherein the number $2^{2n}$ of 2n-bit response symbols are hardwired in the $2^{2n}$ rows of second memory cells; and switching on a row of second memory cells to output its hardwired 2n-bit response symbol as a 2n-bit product code in response to a received activated switching signal.

* * * * *